US011627581B2

(12) United States Patent
Khoshnevisan et al.

(10) Patent No.: US 11,627,581 B2
(45) Date of Patent: Apr. 11, 2023

(54) RANK INDICATOR AND LAYER INDICATOR SIGNALING IN NON-COHERENT JOINT TRANSMISSION CHANNEL STATE INFORMATION

(71) Applicant: QUALCOMM Incorporated, San Diego, CA (US)

(72) Inventors: Mostafa Khoshnevisan, San Diego, CA (US); Chenxi Hao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/683,036

(22) Filed: Feb. 28, 2022

(65) Prior Publication Data
US 2022/0321183 A1    Oct. 6, 2022

Related U.S. Application Data

(63) Continuation of application No. PCT/CN2021/084617, filed on Mar. 31, 2021.

(51) Int. Cl.
*H04W 72/04* (2009.01)
*H04W 72/08* (2009.01)
(Continued)

(52) U.S. Cl.
CPC ........ *H04W 72/048* (2013.01); *H04B 7/0473* (2013.01); *H04B 7/0486* (2013.01);
(Continued)

(58) Field of Classification Search
CPC .................................................... H04B 7/0486
(Continued)

(56) References Cited

U.S. PATENT DOCUMENTS 9,537,638 B2    1/2017  Geirhofer et al.
2012/0287799 A1*  11/2012  Chen .................... H04B 7/0626
370/252
(Continued)

FOREIGN PATENT DOCUMENTS

CN          108039903 A      5/2018
CN          110546911 A      12/2019
WO     WO-2013170114 A1     11/2013

OTHER PUBLICATIONS

Huawei, et al., "Summary of Further Email Discussion for Rel-17 CSI Enhancements", R1-2009530, 3GPP TSG RAN WG1 Meeting #103-e, Nov. 13, 2020 (Nov. 13, 2020), 47 Pages, The Whole Document.

(Continued)

*Primary Examiner* — Lihong Yu
(74) *Attorney, Agent, or Firm* — Qualcomm Incorporated

(57) ABSTRACT

Methods, systems, and devices for wireless communications are described. In some wireless communications systems, a user equipment (UE) may receive an indication of first and second channel measurement resources associated with corresponding first and second transmission configuration indicator states. The UE may identify a rank restriction parameter for obtaining channel state information for a joint transmission hypothesis associated with the first and second channel measurement resources. The UE may generate and transmit a channel state information report that includes at least one rank indicator corresponding to the joint transmission hypothesis in accordance with the rank restriction parameter.

30 Claims, 17 Drawing Sheets

(51) Int. Cl.
  *H04B 7/06* (2006.01)
  *H04W 72/0453* (2023.01)
  *H04W 72/044* (2023.01)
  *H04B 7/0456* (2017.01)
  *H04B 7/08* (2006.01)

(52) U.S. Cl.
  CPC ......... *H04B 7/0626* (2013.01); *H04B 7/0639* (2013.01); *H04B 7/0848* (2013.01); *H04W 72/046* (2013.01); *H04W 72/0453* (2013.01); *H04W 72/085* (2013.01)

(58) Field of Classification Search
  USPC ........................................................ 375/262
  See application file for complete search history.

(56) References Cited

U.S. PATENT DOCUMENTS

2019/0037586 A1\* 1/2019 Park ................... H04L 1/0031
2020/0091977 A1   3/2020 Hang et al.

OTHER PUBLICATIONS

International Search Report and Written Opinion—PCT/CN2021/084617—ISA/EPO—dated Dec. 29, 2021.
Samsung: "CSI Feedback Overhead Reduction for NCJT", R1-1715935, 3GPP TSG RAN WG1 Meeting AH_NR#3, Sep. 21, 2017 (Sep. 21, 2017), 4 Pages, The Whole Document.

\* cited by examiner

RANK INDICATOR AND LAYER INDICATOR SIGNALING IN NON-COHERENT JOINT TRANSMISSION CHANNEL STATE INFORMATION

CROSS REFERENCE

The present application for patent is a Continuation of Chinese PCT Application No. PCT/CN2021/084617 by KHOSHNEVISAN et al., entitled "RANK INDICATOR AND LAYER INDICATOR SIGNALING IN NON-COHERENT JOINT TRANSMISSION CHANNEL STATE INFORMATION" filed Mar. 31, 2021, assigned to the assignee hereof, and expressly incorporated by reference in its entirety herein.

FIELD OF TECHNOLOGY

The following relates to wireless communications, including rank indicator and layer indicator signaling in non-coherent joint transmission (NCJT) channel state information (CSI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may send channel state information (CSI) reports to a base station in a wireless communications network. Some conventional CSI reporting techniques, however, may be deficient.

SUMMARY

The described techniques relate to improved methods, systems, devices, and apparatuses that support rank indicator and layer indicator signaling in non-coherent joint transmission (NCJT) channel state information (CSI). Generally, the described techniques provide for supporting coordinated communications in the wireless communications system based on the NCJT CSI with one or more rank indicators (RIs) and layer indicators (LIs).

In some examples, a user equipment (UE) may indicate one or more RIs and associated LIs in the CSI report using a number of different techniques. For example, the UE may receive an indication of first and second channel measurement resources (CMRs) that are configured for measuring channel measurement reference signals for inclusion in a CSI report. Based on one or more rank restriction parameters for obtaining the CSI for NCJT associated with the first and second CMRs, the UE may transmit the CSI that includes one or more RIs in accordance with the rank restriction. In addition, the UE may transmit an indication of one or more LIs associated with the one or more RIs. For example, the UE may format RIs and LIs in joint or separate fields in the first or second portion of the CSI report in accordance with the rank restrictions.

A method for wireless communications at a user equipment (UE) is described. The method may include receiving an indication of a first CMR and a second CMR, each configured for measuring channel state information reference signals (CSI-RSs), the first CMR associated with a first transmission configuration indicator (TCI) state and the second CMR associated with a second TCI state, identifying a rank restriction parameter for obtaining CSI for a joint transmission hypothesis associated with the first CMR and the second CMR, and transmitting a CSI report that includes at least one rank indicator corresponding to the joint transmission hypothesis in accordance with the rank restriction parameter.

An apparatus for wireless communications at a UE is described. The apparatus may include a processor, memory coupled with the processor, and instructions stored in the memory. The instructions may be executable by the processor to cause the apparatus to receive an indication of a first CMR and a second CMR, each configured for measuring CSI-RSs, the first CMR associated with a first TCJ state and the second CMR associated with a second TCJ state, identify a rank restriction parameter for obtaining CSI for a joint transmission hypothesis associated with the first CMR and the second CMR, and transmit a CSI report that includes at least one rank indicator corresponding to the joint transmission hypothesis in accordance with the rank restriction parameter.

Another apparatus for wireless communications at a UE is described. The apparatus may include means for receiving an indication of a first CMR and a second CMR, each configured for measuring CSI-RSs, the first CMR associated with a first TCJ state and the second CMR associated with a second TCJ state, means for identifying a rank restriction parameter for obtaining CSI for a joint transmission hypothesis associated with the first CMR and the second CMR, and means for transmitting a CSI report that includes at least one rank indicator corresponding to the joint transmission hypothesis in accordance with the rank restriction parameter.

A non-transitory computer-readable medium storing code for wireless communications at a UE is described. The code may include instructions executable by a processor to receive an indication of a first CMR and a second CMR, each configured for measuring CSI-RSs, the first CMR associated with a first TCJ state and the second CMR associated with a second TCJ state, identify a rank restriction parameter for obtaining CSI for a joint transmission hypothesis associated with the first CMR and the second CMR, and transmit a CSI report that includes at least one rank indicator corresponding to the joint transmission hypothesis in accordance with the rank restriction parameter.

Some examples of the method, apparatuses, and non-transitory computer-readable medium described herein may further include operations, features, means, or instructions for transmitting, to a base station, a capability of the UE to transmit the CSI report including the at least one rank indicator for a joint transmission hypothesis or a single transmission hypothesis in accordance with the rank restriction parameter.

In some examples of the method, apparatuses, and non-transitory computer-readable medium described herein, the at least one rank indicator includes two rank indicators and the method, apparatuses, and non-transitory computer-readable medium may include further operations, features, means, or instructions for transmitting the two rank indicators in a joint rank indication field in a first portion of the CSI report associated with the first TCI state and the second TCI state corresponding to the joint transmission hypothesis.

In some examples of the method, apparatuses, and non-transitory computer-readable medium described herein, the CSI report includes first CSI corresponding to the joint transmission hypothesis and second CSI corresponding to a single transmission hypothesis and the method, apparatuses, and non-transitory computer-readable medium may include further operations, features, means, or instructions for identifying a set of multiple allowed rank combinations for the joint transmission hypothesis and determining a bit width of the joint rank indication field based on a set of multiple allowed rank combinations.

In some examples of the method, apparatuses, and non-transitory computer-readable medium described herein, the CSI report includes CSI corresponding to either the joint transmission hypothesis or a single transmission hypothesis and the method, apparatuses, and non-transitory computer-readable medium may include further operations, features, means, or instructions for identifying, based on the rank restriction parameter, a first number of bits associated with CSI of the joint transmission hypothesis and a second number of bits associated with CSI of the single transmission hypothesis and determining a bit width of the joint rank indication field based on the first number of bits and the second number of bits.

In some examples of the method, apparatuses, and non-transitory computer-readable medium described herein, the bit width of the joint rank indication field may be further based on a maximum value of the first number of bits and the second number of bits, the bit width being the same for the joint rank indication field associated with the joint transmission hypothesis or the single transmission hypothesis.

In some examples of the method, apparatuses, and non-transitory computer-readable medium described herein, the at least one rank indicator includes two rank indicators and the method, apparatuses, and non-transitory computer-readable medium may include further operations, features, means, or instructions for transmitting two rank indicators in separate rank indication fields in at least one portion of the CSI report.

Some examples of the method, apparatuses, and non-transitory computer-readable medium described herein may further include operations, features, means, or instructions for transmitting the separate rank indication fields in a first portion of the CSI report, the first portion of the CSI report having a constant payload size.

In some examples of the method, apparatuses, and non-transitory computer-readable medium described herein, the separate rank indication fields include a first rank indication field and a second rank indication field and the method, apparatuses, and non-transitory computer-readable medium may include further operations, features, means, or instructions for determining a bit width of the first rank indication field and the second rank indication field based on respective ranks of the first CMR and the second CMR of the CSI report.

In some examples of the method, apparatuses, and non-transitory computer-readable medium described herein, the separate rank indication fields include a first rank indication field and a second rank indication field and the method, apparatuses, and non-transitory computer-readable medium may include further operations, features, means, or instructions for transmitting the first rank indication field in a first portion of the CSI report and the second rank indication field in a second portion of the CSI report.

In some examples of the method, apparatuses, and non-transitory computer-readable medium described herein, a bit width for the first rank indication field may be based on a first number of bits associated with CSI of the joint transmission hypothesis and a second number of bits associated with CSI of the single transmission hypothesis.

In some examples of the method, apparatuses, and non-transitory computer-readable medium described herein, the bit width of the first rank indication field may be further based on a maximum value of the first number of bits and the second number of bits, the bit width being the same for the first rank indication field associated with the joint transmission hypothesis or the single transmission hypothesis.

In some examples of the method, apparatuses, and non-transitory computer-readable medium described herein, a bit width for the second rank indication field may be based on a rank restriction for a second rank associated with the joint transmission hypothesis.

In some examples of the method, apparatuses, and non-transitory computer-readable medium described herein, the rank restriction parameter for obtaining CSI may be applied only for a CSI report associated with a single transmission hypothesis.

Some examples of the method, apparatuses, and non-transitory computer-readable medium described herein may further include operations, features, means, or instructions for determining a rank or rank combination associated with the joint transmission hypothesis based on a multiplexing scheme for the CSI report irrespective of the rank restriction parameter.

In some examples of the method, apparatuses, and non-transitory computer-readable medium described herein, the rank restriction parameter for obtaining CSI for the joint transmission hypothesis may be based on a rank restriction parameter for obtaining CSI for a single transmission hypothesis.

In some examples of the method, apparatuses, and non-transitory computer-readable medium described herein, the rank restriction parameter applies to a first rank indicator of the at least one rank indicator, a second rank indicator of the at least one rank indicator, or a sum of the first rank indicator and the second rank indicator.

In some examples of the method, apparatuses, and non-transitory computer-readable medium described herein, the rank restriction parameter may be configured for a single transmission hypothesis via a first control parameter, and for the joint transmission hypothesis via a second control parameter, the first control parameter being different from the second control parameter.

In some examples of the method, apparatuses, and non-transitory computer-readable medium described herein, the at least one rank indicator may be associated with at least two layer indicators and the method, apparatuses, and non-transitory computer-readable medium may include further operations, features, means, or instructions for transmitting, to a base station, an indication of the at least two layer indicators in at least two separate layer indication fields.

In some examples of the method, apparatuses, and non-transitory computer-readable medium described herein, the at least two separate layer indication fields include a first layer indication field and a second layer indication field and the method, apparatuses, and non-transitory computer-readable medium may include further operations, features, means, or instructions for determining a bit width of the first layer indication field and the second layer indication field based on corresponding reported values of one or more rank indicators.

In some examples of the method, apparatuses, and non-transitory computer-readable medium described herein, the one or more rank indicators may be associated with at least two layer indicators and the method, apparatuses, and non-transitory computer-readable medium may include further operations, features, means, or instructions for transmitting, to a base station, an indication of the at least two layer indicators in a joint layer indication field.

Some examples of the method, apparatuses, and non-transitory computer-readable medium described herein may further include operations, features, means, or instructions for determining a bit width of the joint layer indication field based on a reported value of the one or more rank indicators.

A method for wireless communications at a base station is described. The method may include transmitting, to a UE, an indication of a first CMR and a second CMR, each configured for measuring CSI-RSs, the first CMR associated with a first TCJ state and the second CMR associated with a second TCJ state, transmitting, to the UE, a rank restriction parameter for obtaining CSI for a joint transmission hypothesis associated with the first CMR and the second CMR, and receiving, in a CSI report that includes the CSI, at least one rank indicator corresponding in accordance with the transmitted rank restriction parameter or a different rank restriction parameter based on the at least one rank indicator being associated with joint transmission hypothesis.

An apparatus for wireless communications at a base station is described. The apparatus may include a processor, memory coupled with the processor, and instructions stored in the memory. The instructions may be executable by the processor to cause the apparatus to transmit, to a UE, an indication of a first CMR and a second CMR, each configured for measuring CSI-RSs, the first CMR associated with a first TCI state and the second CMR associated with a second TCI state, transmit, to the UE, a rank restriction parameter for obtaining CSI for a joint transmission hypothesis associated with the first CMR and the second CMR, and receive, in a CSI report that includes the CSI, at least one rank indicator corresponding in accordance with the transmitted rank restriction parameter or a different rank restriction parameter based on the at least one rank indicator being associated with joint transmission hypothesis.

Another apparatus for wireless communications at a base station is described. The apparatus may include means for transmitting, to a UE, an indication of a first CMR and a second CMR, each configured for measuring CSI-RSs, the first CMR associated with a first TCI state and the second CMR associated with a second TCI state, means for transmitting, to the UE, a rank restriction parameter for obtaining CSI for a joint transmission hypothesis associated with the first CMR and the second CMR, and means for receiving, in a CSI report that includes the CSI, at least one rank indicator corresponding in accordance with the transmitted rank restriction parameter or a different rank restriction parameter based on the at least one rank indicator being associated with joint transmission hypothesis.

A non-transitory computer-readable medium storing code for wireless communications at a base station is described. The code may include instructions executable by a processor to transmit, to a UE, an indication of a first CMR and a second CMR, each configured for measuring CSI-RSs, the first CMR associated with a first TCI state and the second CMR associated with a second TCI state, transmit, to the UE, a rank restriction parameter for obtaining CSI for a joint transmission hypothesis associated with the first CMR and the second CMR, and receive, in a CSI report that includes the CSI, at least one rank indicator corresponding in accordance with the transmitted rank restriction parameter or a different rank restriction parameter based on the at least one rank indicator being associated with joint transmission hypothesis.

Some examples of the method, apparatuses, and non-transitory computer-readable medium described herein may further include operations, features, means, or instructions for receiving, from the UE, and indication of a capability of the UE to transmit the CSI report including the at least one rank indicator for a joint transmission hypothesis or a single transmission hypothesis in accordance with the rank restriction parameter.

In some examples of the method, apparatuses, and non-transitory computer-readable medium described herein, the at least one rank indicator includes two rank indicators and the method, apparatuses, and non-transitory computer-readable medium may include further operations, features, means, or instructions for receiving the two rank indicators in a joint rank indication field in a first portion of the CSI report associated with the first TCI state and the second TCI state corresponding to the joint transmission hypothesis.

In some examples of the method, apparatuses, and non-transitory computer-readable medium described herein, the CSI report includes first CSI corresponding to the joint transmission hypothesis and second CSI corresponding to a single transmission hypothesis and the method, apparatuses, and non-transitory computer-readable medium may include further operations, features, means, or instructions for receiving the channel status information report having a bit width that may be based on a set of multiple allowed rank combinations for the joint transmission hypothesis.

In some examples of the method, apparatuses, and non-transitory computer-readable medium described herein, the CSI report includes CSI corresponding to either the joint transmission hypothesis or a single transmission hypothesis and the method, apparatuses, and non-transitory computer-readable medium may include further operations, features, means, or instructions for receiving the joint rank indication field having a bit width that may be based on a first number of bits associated with CSI of the joint transmission hypothesis and a second number of bits associated with CSI of the single transmission hypothesis.

In some examples of the method, apparatuses, and non-transitory computer-readable medium described herein, the at least one rank indicator includes two rank indicators and the method, apparatuses, and non-transitory computer-readable medium may include further operations, features, means, or instructions for receiving two rank indicators in separate rank indication fields in at least one portion of the CSI report.

Some examples of the method, apparatuses, and non-transitory computer-readable medium described herein may further include operations, features, means, or instructions for receiving the separate rank indication fields in a first portion of the CSI report, the first portion of the CSI report having a constant payload size.

In some examples of the method, apparatuses, and non-transitory computer-readable medium described herein, the separate rank indication fields include a first rank indication field and a second rank indication field and the method, apparatuses, and non-transitory computer-readable medium may include further operations, features, means, or instructions for receiving the first rank indication field and the second rank indication field having a bit width that may be based on respective ranks of the first CMR and the second CMR of the CSI report.

In some examples of the method, apparatuses, and non-transitory computer-readable medium described herein, the separate rank indication fields include a first rank indication field and a second rank indication field and the method, apparatuses, and non-transitory computer-readable medium may include further operations, features, means, or instructions for receiving the first rank indication field in a first portion of the CSI report and the second rank indication field in a second portion of the CSI report.

In some examples of the method, apparatuses, and non-transitory computer-readable medium described herein, a bit width for the first rank indication field may be based on a first number of bits associated with CSI of the joint transmission hypothesis and a second number of bits associated with CSI of the single transmission hypothesis.

In some examples of the method, apparatuses, and non-transitory computer-readable medium described herein, a bit width for the second rank indication field may be based on a rank restriction for a second rank associated with the joint transmission hypothesis.

In some examples of the method, apparatuses, and non-transitory computer-readable medium described herein, the rank restriction parameter for obtaining CSI may be applied only for a CSI report associated with a single transmission hypothesis.

In some examples of the method, apparatuses, and non-transitory computer-readable medium described herein, a rank or rank combination associated with the single transmission hypothesis may be based on a multiplexing scheme for the CSI report irrespective of the rank restriction parameter.

In some examples of the method, apparatuses, and non-transitory computer-readable medium described herein, the rank restriction parameter for obtaining CSI for the joint transmission hypothesis may be based on a rank restriction parameter for obtaining CSI for a single transmission hypothesis.

In some examples of the method, apparatuses, and non-transitory computer-readable medium described herein, the rank restriction parameter applies to a first rank indicator of the at least one rank indicator, a second rank indicator of the at least one rank indicator, or a sum of the first rank indicator and the second rank indicator.

In some examples of the method, apparatuses, and non-transitory computer-readable medium described herein, the rank restriction parameter may be configured for a single transmission hypothesis via a first control parameter, and for the joint transmission hypothesis via a second control parameter, the first control parameter being different from the second control parameter.

In some examples of the method, apparatuses, and non-transitory computer-readable medium described herein, the at least one rank indicator may be associated with at least two layer indicators and the method, apparatuses, and non-transitory computer-readable medium may include further operations, features, means, or instructions for receiving, from the UE, an indication of the at least two layer indicators in at least two separate layer indication fields.

In some examples of the method, apparatuses, and non-transitory computer-readable medium described herein, the at least two separate layer indication fields include a first layer indication field and a second layer indication field, the bit width of the first layer indication field and the second layer indication field based on corresponding reported values of one or more rank indicators.

In some examples of the method, apparatuses, and non-transitory computer-readable medium described herein, the one or more rank indicators may be associated with at least two layer indicators and the method, apparatuses, and non-transitory computer-readable medium may include further operations, features, means, or instructions for receiving, from the UE, an indication of the at least two layer indicators in a joint layer indication field.

In some examples of the method, apparatuses, and non-transitory computer-readable medium described herein, a bit width of the joint layer indication field may be based on a reported value of the one or more rank indicators.

DETAILED DESCRIPTION

In some wireless communications systems, a user equipment (UE) may perform measurements of signals transmitted by one or more base stations or transmission reception points (TRPs), and may include these measurements in a channel state information (CSI) report. In some cases, the UE may participate in multi-TRP (mTRP) operation, where a number of TRPs may communicate with the UE at a same time. This is in contrast to single TRP (sTRP) operation, where the UE communicates with a single TRP at a given time. In cases where the UE supports mTRP operations, the UE may engage in separate, or non-joint, transmissions with different single TRPs, or the UE may engage in non-coherent joint transmissions (NCJT) with a pair of TRPs. Thus, when providing CSI reports, the UE may provide CSI reports on a per-TRP basis (for sTRP operation) or for joint TRP communications (for mTRP operation).

To support coordinated communications in the wireless communications system, the UE may generate one or more CSI reports which may be NCJT CSI or sTRP CSI associated with one or more TRPs. NCJT CSI may be transmitted using a spatial division multiplexing (SDM) scheme, and the UE may include two rank indicators (RIs) corresponding to different sets of layers or layer indicators (LIs). In some other examples, a CSI report may be transmitted in accordance with different multiplexing schemes such as frequency division multiplexing (FDM) or time division multiplexing (TDM), or via a single frequency network physical downlink shared channel (SFN PDSCH). In such examples, one RI may be included in the CSI report, and the rank may be the same across two TCI states or TRPs.

In some examples, the UE may indicate one or more RIs and associated LIs in the CSI report using a number of different techniques. For example, the UE may report RIs and LIs based on different rank restriction parameters or multiplexing schemes, and the UE may format RIs and Us in joint or separate fields in the first or second portion of the CSI report in accordance with a multiplexing scheme and the rank restrictions.

Aspects of the disclosure are initially described in the context of wireless communications systems. Aspects of the disclosure are further illustrated by and described with reference to apparatus diagrams, system diagrams, a process flow, and flowcharts that relate to rank indicator and layer indicator signaling in NCJT CSI.

Figure 1:
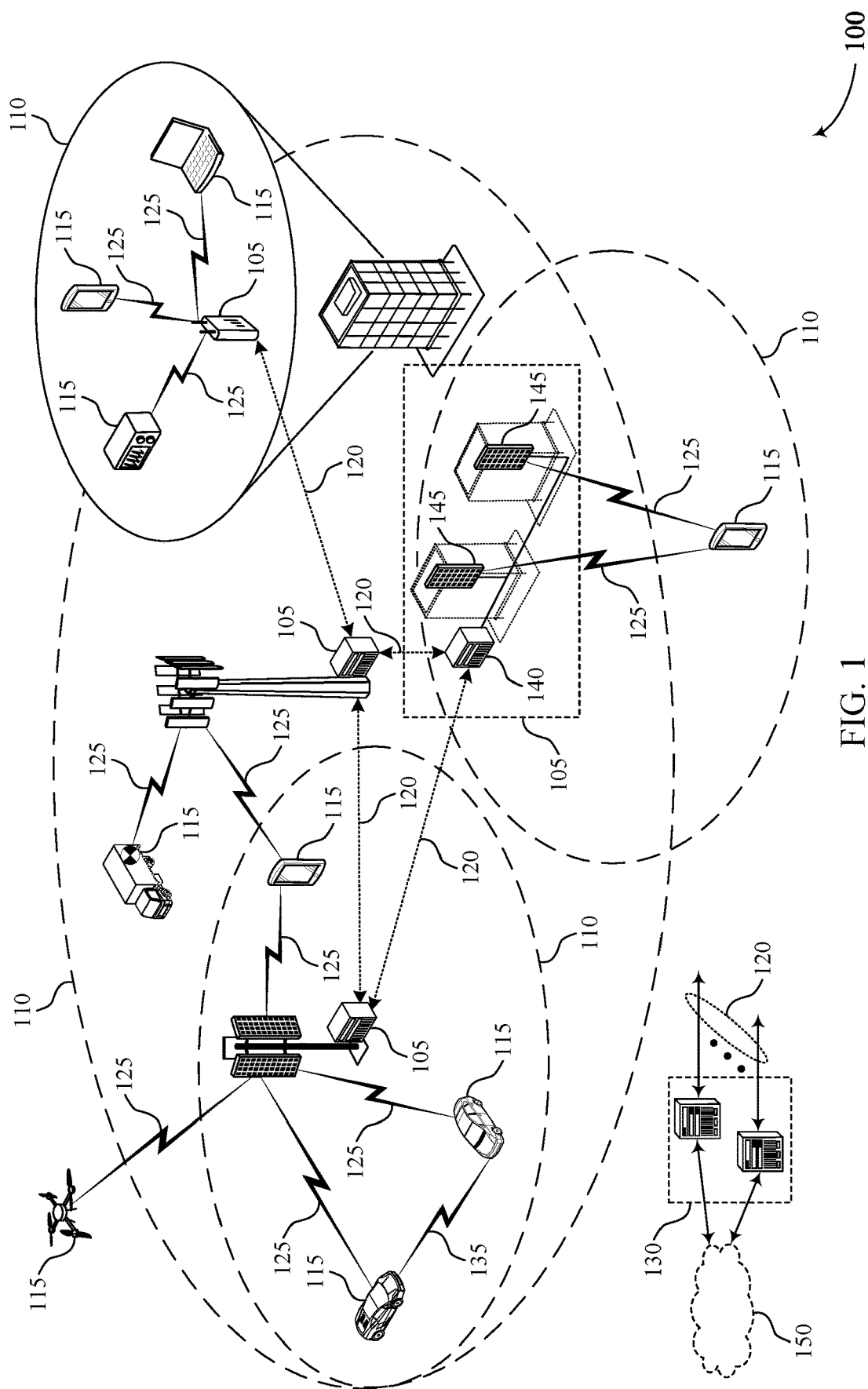
FIG. 1 illustrates an example of a wireless communications system that supports rank indicator and layer indicator signaling in non-coherent joint transmission (NCJT) channel state information (CSI) in accordance with aspects of the present disclosure.

FIG. 1 illustrates an example of a wireless communications system 100 that supports rank indicator and layer indicator signaling in NCJT CSI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station may send to a UE 115 a CSI report configuration that configures resources for a CSI report. The CSI report configuration may be linked to one or more resource settings, each of which may have an active resource set. For example, the CSI report configuration may be linked to a single resource setting (e.g., a resource setting for channel measurement resources (CMR)), to two resource settings (e.g., a resource setting for CMR and a resource setting for CSI-IM or non-zero-power IMR (NZP-IMR)), or to three resource settings (e.g., a resource setting for CMR, a resource setting for CSI-IM, and a resource setting for NZP-IMR). Each resource setting may have multiple resource sets, one of which may be an active resource set that the UE 115 is to use for CSI measurements. For example, a CMR resource setting may have n CMR resource sets, one of which may be configured for channel measurements. A CSI-IM resource setting may have m CSI-IM resource sets, one of which may be configured for interference measurements. And an NZP-IMR resource setting may have s NZP-IMR resource sets, one of which is configured for interference measurements. An active resource set may include one or more resources (e.g., Nresources).

Each CMR in a CMR resource set may be associated with (e.g., correspond to, be configured with) a respective TCI (TCI) state, which may also be referred to as a transmission reception point (TRP). Thus, each CMR may be associated with a TRP.

A CMR in a CMR resource set may also be associated with (e.g., correspond to, be configured for) a single-TRP (sTRP) hypothesis. If the TRPs associated with a UE 115 support joint transmissions, a pair of CMR resources in the CMR resource set may be configured for the NCJT hypothesis associated with those TRPs. The CMRs that make up a pair of CMR resources for an NCJT hypothesis may be selected from two groups of CMR resources determined by the base station 105 (e.g., one CMR may be selected from the first group and the other CMR may be selected from the second group). So, one or more CMRs in a CMR resource set may be configured for respective sTRP hypotheses and one or more pairs of CMRs (e.g., N pairs) in the CMR resource set may be configured for respective NCJT hypotheses. A CMR in a CMR resource set may be used for both a NCJT hypothesis and an sTRP hypothesis. A hypothesis may also be referred to as a transmission hypothesis, a measurement hypothesis, a CSI hypothesis, or other suitable terminology.

A UE 115 may be configured to provide one or more CSI reports corresponding to various hypotheses. In a first CSI reporting option (referred to as Option 1), the UE 115 may be configured to report a CSI report for the NCJT hypotheses configured for the UE and X (e.g., 0, 1, 2) CSI reports for the sTRP hypothesis configured for the UE 115. A CSI report for an NCJT (referred to as an NCJT CSI report) may be a CSI report that is associated with multiple (e.g., two) CMRs, which in turn may be configured with two corresponding TCI states associated with two TRPs, respectively. In the first option (Option 1), the UE 115 may generate CSI for each NCJT hypothesis and select the best CSI to report to the base station 105. If X is equal to zero (e.g., the UE 115 is configured to provide zero CSI reports for sTRP hypotheses), the UE 115 may not generate CSI for any sTRP hypotheses. So, when X is equal to zero in Option 1, the CMRs in any of the two groups may not be used for sTRP hypotheses (rather, the CMRs may be used as pairs for NCJT hypotheses).

In a second CSI reporting option (Option 2), the UE 115 may be configured to report a single (e.g., best) CSI report for the collection of NCJT and sTRP hypotheses configured for the UE 115. In either Option 1 or Option 2, a CSI report may include a CSI-RS resource indicator (CRI) that indicates the CSI-RS resource (e.g., the CMR) to which the CSI report corresponds.

For either reporting option, the UE 115 may be configured to transmit a CSI report in uplink control information (UCI) associated with a NCJT measurement hypothesis or a sTRP hypothesis configured by single CSI reporting setting. In such cases, the UE 115 may include one or more rank indicators (RIs), PMIs, and layer indicators (LIs) per codeword. For example, the UE 115 may be configured to report two RIs, PMIs and Us in the UCI. In addition, the UE may report one channel quality information (CQI).

The UE may format the RIs, Us, PMIs, and CQI in one or more CSI reports or portions of a CSI report. For example, in some cases the UE 115 may determine a number of bits for RI and LI reporting based on a number of antenna ports (e.g., the number of CSI-RS ports or number of ports in a CMR), and a number of possible RI values configured by RRC. The reported LI my in some cases correspond to the strongest layer associated with an RI, and number of bits for reporting the LI may be based on a reported RI value.

In some examples, the UE 115 may report the RIs and CRI (which determines whether a NCJT CSI hypothesis or an sTRP hypothesis is reported) in a first portion of a CSI (e.g., CSI part 1), while reporting LIs and PMIs in a second portion of CSI (e.g., CSI part 2). In some cases, the number of bits for reporting PMI and CSI may be a function of RI and CMR such that the size or bit width of LI and PMI fields in the CSI part 2 may depend at least partially on RI value in CSI part 1. In such examples, the CSI part 1 may have constant size (e.g., irrespective of the CSI payload) while the size of CSI part 2 may be based on the corresponding payload of CSI part 1 (e.g., CSI part 1 and CSI part 2 may be separately encoded).

According to the techniques described herein, a UE 115 may improve NCJT CSI reporting by using one or more techniques for reporting two RIs and LIs in accordance with various rank restriction parameters for NCJT CSI reporting. The described techniques may allow for indicating the RIs and LIs in joint fields or separate fields of one or more CSI reports in accordance with various rank restrictions. Additionally or alternatively, the UE 115 may implement different RI and LI reporting based on various multiplexing schemes for NCJT CSI reporting (e.g., SDM, FDM, TDM, and SFN schemes) which may be associated with different number of reported RIs and LIs in a CSI.

Figure 2:
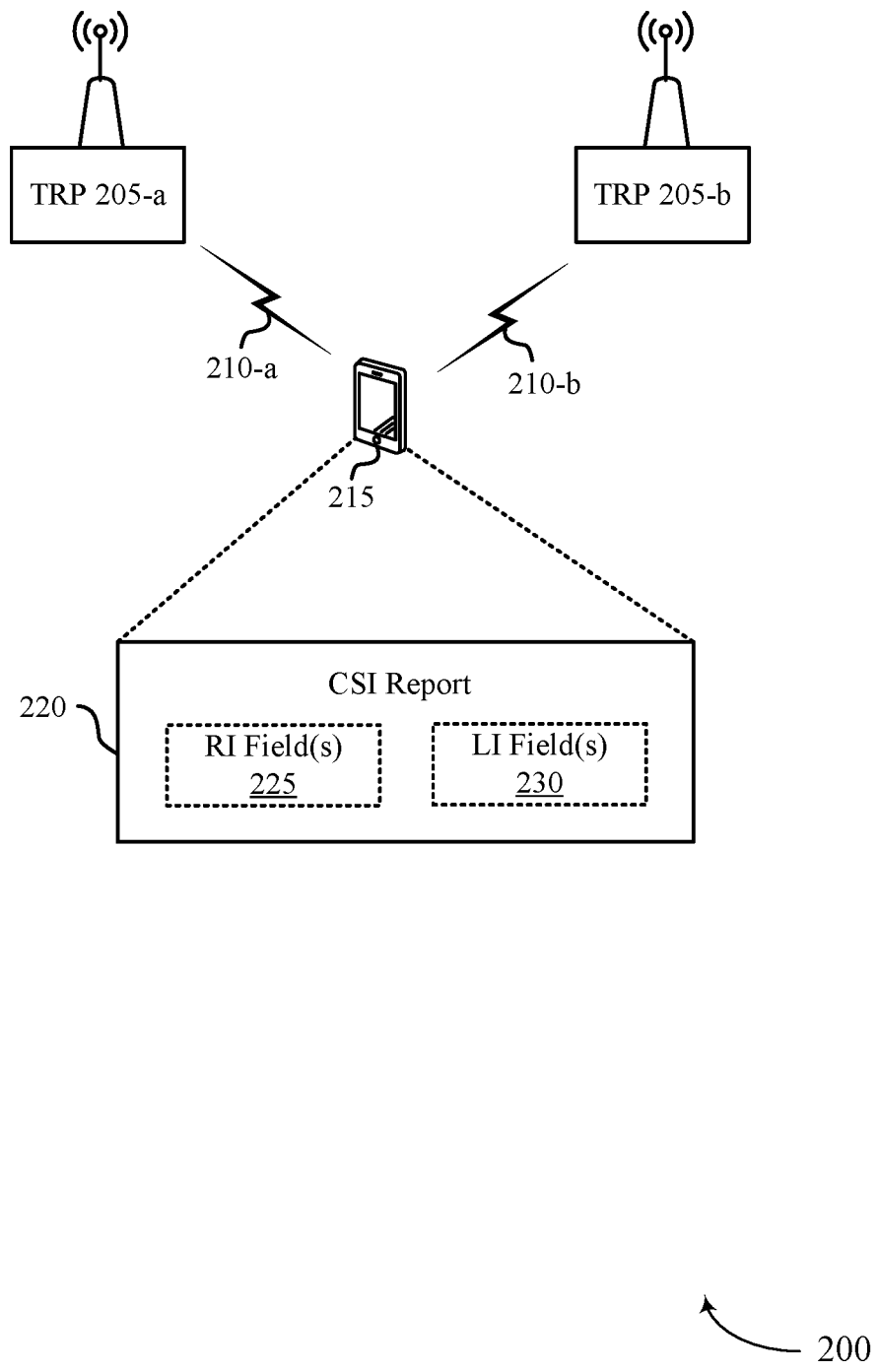
FIG. 2 illustrates an example of a wireless communications system that supports rank indicator and layer indicator signaling in NCJT CSI in accordance with aspects of the present disclosure.

FIG. 2 illustrates an example of a wireless communications system 200 that supports rank indicator and layer indicator signaling in NCJT CSI in accordance with aspects of the present disclosure. The wireless communications system 200 may include TRP 205-a and TRP 205-b as well as a UE 215. The UE 215 may receive communications from TRP 205-a (e.g., over communication link 210-b) and TRP 205-b (e.g., over communication link 210-b). The communications from TRP 205-a and TRP 205-b may be at least partially coordinated by a base station associated with TRP 205-a and TRP 205-b.

In some examples, the ULE 215 may receive separate (non-joint, single) communications from TRP 205-a and TRP 205-b, where a separate communication is a communication from one of the TRPs 205 independent of the other TRP 205. In some examples, the UE 215 may receive joint communications from the TRPs 205, where a joint communication is a communication from both the TRPs 205. Thus, the TRPs 205 may be configured to support separate transmissions and joint transmissions. In some examples, the TRPs 205 may be configured to support coherent joint transmissions, non-coherent joint transmissions, or both. A coherent joint transmission may be a transmission in which transmission weights at the TRPs 205 are selected (based on knowledge of the channels between the UE 215 and the TRPs 205) to focus the energy at the UE 215 (e.g., in a type of non-co-located beamforming). A NCJT may be a transmission in which the TRPs 205 cooperate to increase the power gain of the transmission, to increase the rank that the UE 215 may be able to receive (for capacity enhancements), or to increase the diversity of the transmission (e.g. for reliability enhancements especially when the signal from one of the TRPs may be blocked due to harsh propagation environment).

To support coordinated communications in wireless communications system 200, devices may generate and exchange CSI reports. For example, the UE 215 may generate one or more CSI reports which may be NCJT CSI or sTRP CSI associated with communications between TRPs 205. NCJT CSI 220 may be transmitted using a spatial division multiplexing (SDM) scheme, where different layers correspond to different TCI states. In such cases, the UE may include two RIs or a rank combination (e.g., corresponding to two sets of layers). Each RI may have a value corresponding to rank 1 or rank 2, and possible rank combinations can be one of {1,1}, {2,1}, {1,2}, and {2,2} included in the CSI report. In some other examples, (e.g., for NCJT CSI) a CSI report may be transmitted in accordance with various different multiplexing schemes such as frequency division multiplexing (FDM) or time division multiplexing (TDM), or via a single frequency network physical downlink shared channel (SFN PDSCH). In such examples, one RI and one LI may be included in the CSI report, and the rank may be the same across two TCI states or TRPs 205. The rank values may be either 1 or 2 in such cases of a single RI.

In either case (e.g., NCJT CSI with SDM, or CSI with FDM/TDM/SFN physical downlink shared channel (PDSCH)), PDSCH schemes used for transmission of the CSI report may be associated with 2 TCI states (e.g., 2 TRPs 205-a and 205-b), and the NCJT CSI corresponding to each of these PDSCH schemes may be based on measurements in the CMR pair (the two CMRs are associated with 2 TCI states/TRPs 205-a and 205-b). For FDM, TDM, or SFN schemes for NCJT CSI, a pair of CMRs may be used, and two PMIs may be reported (similar to SDM schemes), but for sTRP implementations, one CMR may be used corresponding to one TCI state, and one PMI may be reported.

In some examples, the UE 215 may indicate the two RIs (e.g., in an SDM scheme) in the CSI report using a number of different techniques and in accordance with a number of different restrictions. For example, the UE 215 may report RIs in different ways based on whether option 1 for CSI reporting (e.g., NCJT hypotheses are separate from sTRP CSI) or option 2 for CSI reporting (e.g., reporting one CSI based on best hypothesis, and CSI part 1 is constant irrespective of sTRP or NCJT reporting) are configured.

In addition, the UE 215 may indicate the two RIs in accordance with a rank restriction configuration (e.g., typeI-SinglePanel-ri-Restriction) associated with the CSI report configuration for NCJT CSI reporting. Further, the UE 215 may report the two RIs along with an indication of two LIs, which may be based on the values of the two reported RIs (e.g., in a SDM scheme).

In a first scenario (case 1), the UE 215 may use a single RI field 225 (e.g., a joint RI field) to indicate the two RIs in a first portion of the CSI report (e.g., CSI part 1). In some examples relating to case 1, option 1 for CSI reporting may be configured (e.g., the UE 215 may report X=0, 1, or 2 single-TRP CSIs and one NCJT CSI separately). In such examples, the bit width or size of the joint RI field 225 may be based on the number of possible rank combinations or rank pairs for NCJT CSI. For example, in the absence of rank restriction, possible rank pairs may include one of {1,1}, {2,1}, {1,2}, and {2,2}, and the UE 215 may need two bits to indicate one of the rank combinations {1,1}, {1,2}, {2,1}, or {2,2}. In some other examples where rank restriction is applied (e.g., via a CSI report configuration), the number of bits used to indicate the joint RI field 225 may be equal to $\lceil \log_2 n_{RI,\,NCJT} \rceil$ bits, where $n_{RI,NCJT}$ is the number of possible rank combinations due to the identified rank restriction.

In some other examples relating to case 1, option 2 for CSI reporting may be configured (e.g., the UE 215 may be configured to report one CSI among all single-TRP and NCJT CSI hypotheses, and the CSI payload is constant). In such examples, the bit width or size of the joint RI field 225 may be the maximum number between a number of bits allocated for single-TRP CSI and a number of bits allocated for NCJT CSI 220. For example, the maximum number may be identified as: $\max(\lceil \log_2 n_{RI} \rceil, \lceil \log_2 n_{RI,NCJT} \rceil)$, where $n_{RI}$ is the number of possible ranks for a single-TRP CSI, and $n_{RI,\,NCJT}$ is the number of possible rank combinations for a NCJT CSI due to the identified rank restriction.

In cases relating to case 1 (option 2), a CRI may determine whether a reported CSI corresponds to single-TRP CSI or NCJT CSI. In such cases, the size of CSI part 1 may be constant irrespective whether single-TRP CSI or NCJT CSI is actually reported (e.g., because both CRI and RI are reported in CSI part 1).

In a second scenario (case 2), the UE 215 may use separate RI fields 225 (e.g., two or more different RI fields) to indicate the two RIs in the CSI report. In some cases, the separate RI fields 225 (e.g., both RI fields 225 for the two RIs) may be formatted in CSI part 1, for example, in cases that option 1 is configured and the CSI part 1 payload size is constant. In this case, the bit width or size of separate RI fields 225 may depend on the number of possible ranks corresponding to first and second CMRs of the CMR pair associated with the NCJT CSI 220. In some other examples, (e.g., in the absence of rank restriction) each RI field 225 may be 1 bit in size.

In some other examples relating to the second scenario (case 2), a first RI field 225 may be reported in CSI part 1, and the second RI field 225 may be reported in CSI part 2. CSI reporting options 1 or 2 may be implemented for case 2. For example, for option 2, the second RI may be in CSI part 2, and the size of CSI part 1 may be kept constant irrespective of CSI reporting based on the single-TRP or NCJT. In addition, to determine the size of CSI part 2, the UE 215 may include two PMIs in the CSI, where the second PMI should be padded to the maximum size of rank-1 and rank-2.

In cases where the first RI field 225 is reported in CSI part 1, and the second RI field 225 may be reported in CSI part 2, the bit width of the first RI field 225 may correspond to a maximum number of bits identified as either the number of bits associated with the single-TRP CSI or the number of bits associated with the NCJT CSI 220 (for the first rank of a rank combination in NCJT CSI 220). The bit width of the second RI field 225 may be determined based on the ranks associated with the second rank in the NCJT CSI 220. In the absence of rank restriction, the bit width may be 1 bit.

In some examples, the UE 215 may report one or more RIs in a CSI report in accordance with a rank restriction or rank restriction parameter that is associated with the size of the RI field 225. For example, in cases where at least one pair of CMR resources in the CMR resource set configured for the NCJT hypothesis associated with TRPs 205-a and 205-b, the UE 215 may determine a number of different rank restrictions based on a CSI reporting configuration.

In a first alternative, the UE 215 may not assume any rank restriction for NCJT CSI 220 as part of a CSI report configuration. In such cases, an existing rank restriction configured for the CSI report configuration may be applicable when a single-TRP CSI is reported. For cases where an SDM scheme is used for the CSI reporting, the possible rank combinations may be {1,1}, {2,1}, {1,2}, and {2,2}, and one of the four rank combination possibilities may be indicated by the two RIs. The UE 215 may assume a total number of possible rank combinations ($n_{RI,NCJT}$) to be $n_{RI,NCJT}$=4 (e.g., 4 possible rank combinations). In cases where a FDM, TDM, or SFN scheme is used, the UE 215 may assume a rank of either 1 or 2, and one of the two rank values may be indicated by the RI. The UE 215 may assume a total number of possible rank combinations ($n_{RI,NCJT}$) to be $n_{RI,NCJT}$=2 (e.g., two possible ranks).

In a second alternative, rank restriction for NCJT CSI 220 may be determined based on the rank restriction identified for sTRP CSI (e.g., an existing rank restriction for CSI reporting) associated with a SDM scheme. In some examples, the restricted rank may apply to a sum of the two RIs corresponding to the CMR pair for the NCJT hypothesis. For example, if ranks 2/3/4 are restricted for a single-TRP CSI, rank combinations {1,1}/{1,2} and {2,1}/{2,2} are not allowed for NCJT CSI 220 (e.g., the sum of the rank combinations for NCJT correspond to the ranks of the sTRP CSI), which corresponds to $n_{RI,NCJT}$=3/2/3, respectively.

In some other examples, the rank restriction may apply to each of the two RIs corresponding to each of the two CMRs. For example, if rank=1/2 is restricted for a single-TRP CSI, rank combinations {1,1} and {1,2} and {2,1}/{1,2} and {2,1} and {2,2} is not allowed for NCJT CSI 220, which corresponds to $n_{RI,NCJT}$=1 in both cases.

In some other examples, rank restriction may apply to one of the two RIs corresponding to each of the two CMRs (either the first CMR in the CMR pair or the second CMR in the CMR pair). For example, in cases where the rank restriction applies to the first CMR, if the rank=1/2 is restricted by the rank restriction for the single-TRP CSI, rank combinations {1,1} and {1,2}/{2,1} and {2,2} are not allowed for NCJT CSI 220, corresponding to $n_{RI,NCJT}$=2 in both cases.

In a third alternative, the rank restriction in a CSI report configuration may be configured separately for single-TRP CSI (which may be configured using a first RRC parameter) versus NCJT CSI (which may be configured using a new RRC parameter). In such cases, if an SDM scheme is used, a bitmap of 4 bits may indicate that one or more of the rank combinations {1,1}, {2,1}, {1,2}, and {2,2} are not allowed. If an FDM, TDM, or SFN schemes is used, a bitmap of 2 bits may indicate that one of the ranks 1 or 2 is not allowed.

The UE 215 may apply rank restrictions described in the first, second, and third alternatives for cases where the RIs are indicated in a joint field for NCJT CSI 220, or in separate fields for NCJT CSI 220. In cases where the RIs are indicated in two different fields, instead of having restriction for rank combination, the UE 215 may apply two restrictions for the first rank and the second rank, (e.g., the number of allowed ranks may be denoted $n_{RI,NCJT,1}$ and $n_{RI,NCJT,2}$ for the two ranks) corresponding to the two CMRs in the CMR pair associated with the NCJT CSI 220.

In addition to indicating one or more RIs in the NCJT CSI 220, the UE 215 may indicate one or more LIs in the NCJT CSI 220. According to a first alternative, the two LIs may be reported using two separate fields in the NCJT CSI 220. In some examples, the size of the first field of the two separate fields is equal to min(1, $\lceil \log_2 v_1 \rceil$) bits, where $v_1$ is the value of the first reported RI of the two indicated RIs (e.g., corresponding the first CMR of the CMR pair). In some other examples, the size of the first field may be the $\lceil \log_2 v_1 \rceil$ bits if the value of each reported RI is 2 layers or less. In addition, the size of the second field may be equal to min (1, $\lceil \log_2 v_2 \rceil$) bits, where $v_2$ is the value of the second indicated RI (e.g., corresponding the second CMR of the CMR pair), for example, in cases where the second RI is in CSI part 1 (e.g., where either a joint RI field for two RIs is indicated in CSI part 1, or separate RI fields are indicated in CSI part 1).

In some other cases, the size of the LI field 230 may be 1 bit irrespective of the value of the second indicated RI (e.g., corresponding the second CMR of the CMR pair), for example when the second RI is in CSI part 2. In such examples that the second RI and the LIs are in CSI part 2, the size of one field (e.g., an LI field) may not be a function of the value of another field (e.g., an RI field 225).

According to a second alternative, the two LIs may be reported via a joint field 230, and the size of the joint field may be based on the reported value of the two RIs. For example, for RI pair (1,1), the size of the joint LI field 230 may be 0 bits (e.g., no LI field). For RI pair (2,1) and (1,2), the size of the joint LI field 230 may be 1 bit. For RI pair (2,2), the size of the joint LI field 230 may be 2 bits.

Figure 3:
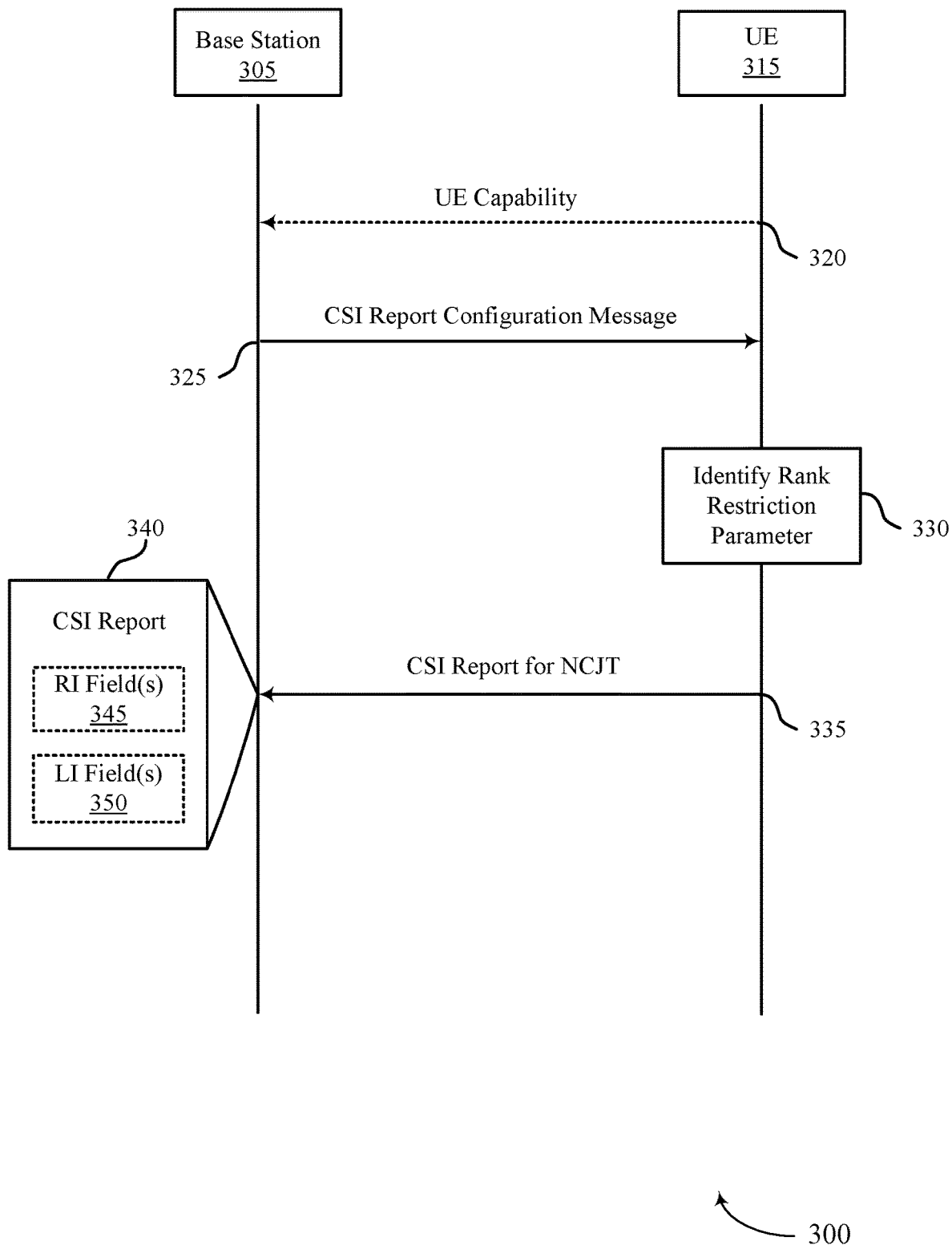
FIG. 3 illustrates an example of a process flow that supports rank indicator and layer indicator signaling in NCJT CSI in accordance with aspects of the present disclosure.

FIG. 3 illustrates an example of a process flow 300 that supports rank indicator and layer indicator signaling in NCJT CSI in accordance with aspects of the present disclosure. In some examples, the process flow 300 may be related to aspects of the wireless communications system 100 or the wireless communications system 200. For example, the process flow 300 may be implemented by a base station 305 and a UE 315, which may be examples of a base station or a UE as described herein. The process flow 300 may allow the UE 315 to indicate one or more RIs and LIs in an NCJT CSI in accordance with various rank restrictions described herein. In some cases, alternative examples of the following process flow may be implemented, where some steps are performed in a different order than described or are not performed at all. In some cases, steps may include additional features not mentioned below, or further steps may be added. In addition, while process flow 300 shows processes between a single base station and UE, it should be understood that these processes may occur between any number of network devices.

At 320, the UE 315 may optionally transmit a capability indication of the UE to transmit CSI reporting that includes at least one RI for a NCJT hypothesis or a sTRP hypothesis in accordance with a rank restriction.

At 325, the base station 305 may transmit, and the UE 315 may receive, an indication of a first CMR and a second CMR, each configured for measuring CSI-RSs, where the first CMR is associated with a first TCI state (e.g., TRP) and the second CMR is associated with a second TCI state (e.g., TRP).

At 330, the UE may identify a rank restriction parameter for obtaining CSI for a joint transmission (e.g., NCJT) hypothesis associated with the first CMR and the second CMR. In some cases, the rank restriction parameter may be applied only for a CSI report associated with a single transmission hypothesis. In some other cases, the rank restriction may indicate a rank or rank combination associated with the joint transmission hypothesis based on a multiplexing scheme for the CSI report. In some other cases, the rank restriction parameter may be based on a rank restriction parameter for obtaining CSI for the single transmission hypothesis.

In some examples, the rank restriction parameter may apply to a first rank indicator of a set of rank indicators, a second rank indicator of the set of rank indicators, or a sum of the first rank indicator and the second rank indicator associated with the CSI report. In some other examples, the UE 315 may receive an indication of the rank restriction parameter configured for the single transmission hypothesis via a first control parameter (e.g., a first RRC parameter), and for the joint transmission hypothesis via a second control parameter (e.g., a second RRC parameter), where the first control parameter is different from the second control parameter.

At 335, the UE 315 may transmit the NCJT CSI report 340 to the base station 305. The NCJT CSI report 340 may include at least one RI corresponding to the joint transmission hypothesis in accordance with the rank restriction parameter.

In some examples, the at least one RI includes two RIs, and the UE 315 may transmit the two RIs in a joint rank indication field 345 in a first portion of the CSI report 340 associated with the first TCI state and the second TCI state corresponding to the joint transmission hypothesis. In such cases, the CSI report 340 may include CSI corresponding to NCJT and CSI corresponding to sTRP, and the UE 315 may format the RI field in accordance with a number of allowed rank combinations associated with the NCJT hypothesis. The bit width of the RI field 345 may be based on one or more of the allowed rank combinations. In some cases, a first number of bits may be associated with the NCJT CSI and a second number of bits may be associated with the sTRP CSI, and the bit width of the RI field may be based on a maximum number of bits determined from the first and second number of bits.

In some examples, the RI field 345 may be two separate RI fields 345, which the UE 315 may use to transmit the two RIs separately. In some cases, the UE 315 may transmit the two RIs in separate portions of the CSI report 340 (e.g., a first RI field in CSI part 1, and a second RI field in CSI part 2), or the UE 315 may transmit the separate RI fields in a first portion of the CSI report 340. In some examples, the UE 315 may determine a bit width of the first RI field and the second RI field based on respective ranks of the first CMR and the second CMR of the CSI report 340. In some other examples, the bit width for the first RI field may be based on a first number of bits associated with the NCJT CSI and a second number of bits associated with the sTRP CSI. For example, the bit width of the first rank indication field may be based on a maximum value between the first number of bits and the second number of bits.

In addition to the RI field 345, the UE 315 may include LI field 350 in the CSI report 340. In some case, the CSI report 340 may include at least two LIs that are indicated in separate layer LI fields 350 (e.g., a first LI field and a second LI field). In some examples, a bit width of the first LI field and the second LI field may be based on corresponding reported values of the one or more RIs.

In some other examples, the LIs may be indicated in a joint LI field 350, and the bit width of the first LI field may be based on a reported value of the one or more RIs.

Figure 4:
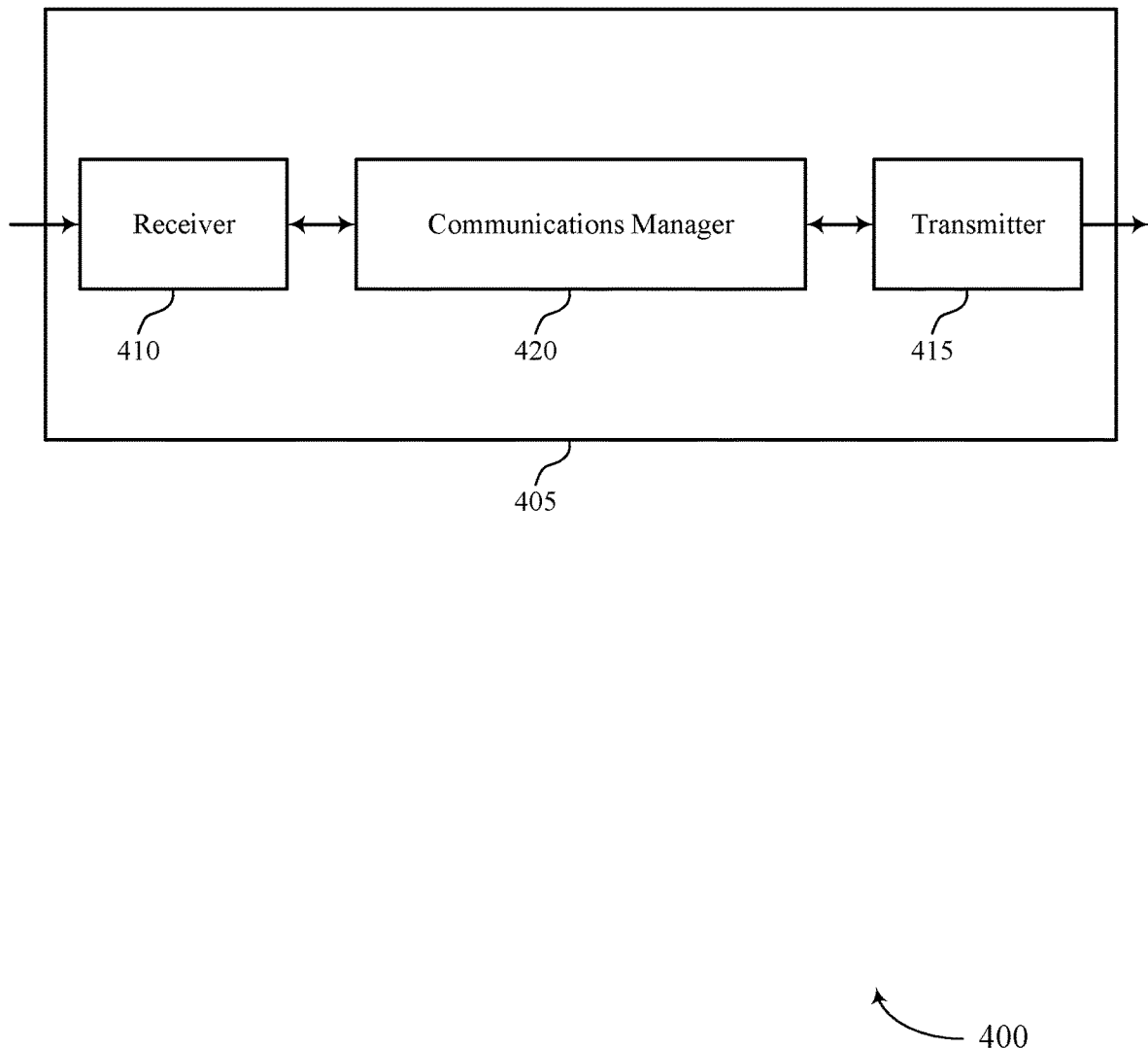
FIGS. 4 and 5 show block diagrams of devices that support rank indicator and layer indicator signaling in NCJT CSI in accordance with aspects of the present disclosure.

FIG. 4 shows a block diagram 400 of a device 405 that supports rank indicator and layer indicator signaling in NCJT CSI in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to rank indicator and layer indicator signaling in NCJT CSI). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to rank indicator and layer indicator signaling in NCJT CSI). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of rank indicator and layer indicator signaling in NCJT CSI as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving an indication of a first CMR and a second CMR, each configured for measuring CSI-RSs, the first CMR associated with a first TCI state and the second CMR associated with a second TCI state. The communications manager 420 may be configured as or otherwise support a means for identifying a rank restriction parameter for obtaining CSI for a joint transmission hypothesis associated with the first CMR and the second CMR. The communications manager 420 may be configured as or otherwise support a means for transmitting a CSI report that includes at least one rank indicator corresponding to the joint transmission hypothesis in accordance with the rank restriction parameter.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources, and more efficient CSI reporting.

Figure 5:
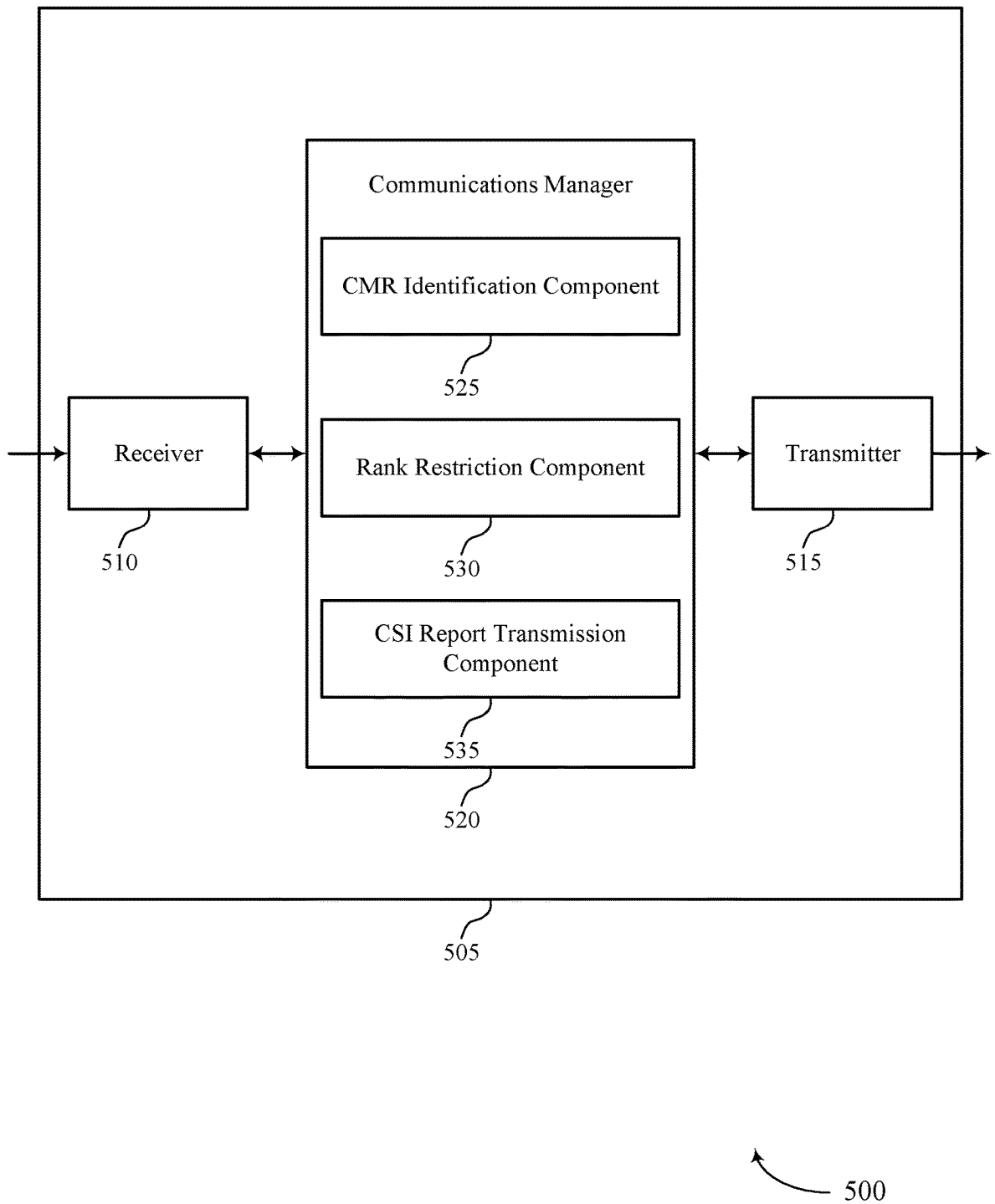

FIG. 5 shows a block diagram 500 of a device 505 that supports rank indicator and layer indicator signaling in NCJT CSI in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to rank indicator and layer indicator signaling in NCJT CSI). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to rank indicator and layer indicator signaling in NCJT CSI). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of rank indicator and layer indicator signaling in NCJT CSI as described herein. For example, the communications manager 520 may include an CMR identification component 525, a rank restriction component 530, a CSI report transmission component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The CMR identification component 525 may be configured as or otherwise support a means for receiving an indication of a first CMR and a second CMR, each configured for measuring CSI-RSs, the first CMR associated with a first TCI state and the second CMR associated with a second TCI state. The rank restriction component 530 may be configured as or otherwise support a means for identifying a rank restriction parameter for obtaining CSI for a joint transmission hypothesis associated with the first CMR and the second CMR. The CSI report transmission component 535 may be configured as or otherwise support a means for transmitting a CSI report that includes at least one rank indicator corresponding to the joint transmission hypothesis in accordance with the rank restriction parameter.

Figure 6:
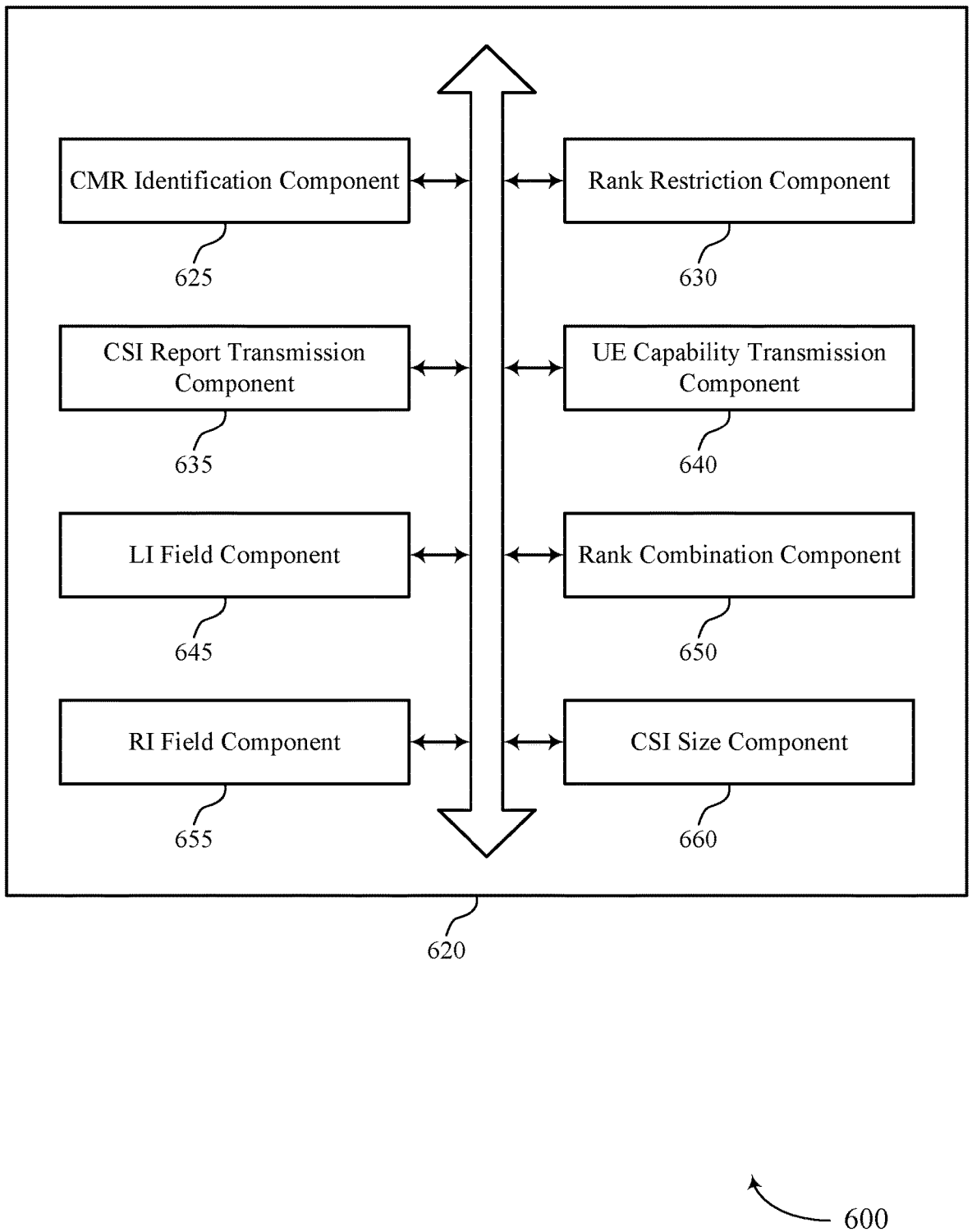
FIG. 6 shows a block diagram of a communications manager that supports rank indicator and layer indicator signaling in NCJT CSI in accordance with aspects of the present disclosure.

FIG. 6 shows a block diagram 600 of a communications manager 620 that supports rank indicator and layer indicator signaling in NCJT CSI in accordance with aspects of the present disclosure. The communications manager 620 may be an example of aspects of a communications manager 420, a communications manager 520, or both, as described herein. The communications manager 620, or various components thereof, may be an example of means for performing various aspects of rank indicator and layer indicator signaling in NCJT CSI as described herein. For example, the communications manager 620 may include an CMR identification component 625, a rank restriction component 630, a CSI report transmission component 635, a UE capability transmission component 640, a LI field component 645, a rank combination component 650, a RI field component 655, a CSI size component 660, or any combination thereof. Each of these components may communicate, directly or indirectly, with one another (e.g., via one or more buses).

The communications manager 620 may support wireless communications at a UE in accordance with examples as disclosed herein. The CMR identification component 625 may be configured as or otherwise support a means for receiving an indication of a first CMR and a second CMR, each configured for measuring CSI-RSs, the first CMR associated with a first TCI state and the second CMR associated with a second TCI state. The rank restriction component 630 may be configured as or otherwise support a means for identifying a rank restriction parameter for obtaining CSI for a joint transmission hypothesis associated with the first CMR and the second CMR. The CSI report transmission component 635 may be configured as or otherwise support a means for transmitting a CSI report that includes at least one rank indicator corresponding to the joint transmission hypothesis in accordance with the rank restriction parameter.

In some examples, the UE capability transmission component 640 may be configured as or otherwise support a means for transmitting, to a base station, a capability of the UE to transmit the CSI report including the at least one rank indicator for a joint transmission hypothesis or a single transmission hypothesis in accordance with the rank restriction parameter.

In some examples, the at least one rank indicator includes two rank indicators, and the CSI report transmission component 635 may be configured as or otherwise support a means for transmitting the two rank indicators in a joint rank indication field in a first portion of the CSI report associated with the first TCI state and the second TCI state corresponding to the joint transmission hypothesis.

In some examples, the CSI report includes first CSI corresponding to the joint transmission hypothesis and second CSI corresponding to a single transmission hypothesis, and the rank combination component 650 may be configured as or otherwise support a means for identifying a set of multiple allowed rank combinations for the joint transmission hypothesis. In some examples, the CSI report includes first CSI corresponding to the joint transmission hypothesis and second CSI corresponding to a single transmission hypothesis, and the RI field component 655 may be configured as or otherwise support a means for determining a bit width of the joint rank indication field based on a set of multiple allowed rank combinations.

In some examples, the CSI report includes CSI corresponding to either the joint transmission hypothesis or a single transmission hypothesis, and the CSI size component 660 may be configured as or otherwise support a means for identifying, based on the rank restriction parameter, a first number of bits associated with CSI of the joint transmission hypothesis and a second number of bits associated with CSI of the single transmission hypothesis. In some examples, the CSI report includes CSI corresponding to either the joint transmission hypothesis or a single transmission hypothesis, and the RI field component 655 may be configured as or otherwise support a means for determining a bit width of the first rank indication field based on the first number of bits and the second number of bits.

In some examples, the bit width of the first rank indication field is further based on a maximum value of the first number of bits and the second number of bits, the bit width being the same for the joint rank indication field associated with the joint transmission hypothesis or the single transmission hypothesis.

In some examples, the at least one rank indicator includes two rank indicators, and the CSI report transmission component 635 may be configured as or otherwise support a means for transmitting two rank indicators in separate rank indication fields in at least one portion of the CSI report.

In some examples, the RI field component 655 may be configured as or otherwise support a means for transmitting the separate rank indication fields in a first portion of the CSI report, the first portion of the CSI report having a constant payload size.

In some examples, the separate rank indication fields include a first rank indication field and a second rank indication field, and the RI field component 655 may be configured as or otherwise support a means for determining a bit width of the first rank indication field and the second rank indication field based on respective ranks of the first CMR and the second CMR of the CSI report.

In some examples, the separate rank indication fields include a first rank indication field and a second rank indication field, and the RI field component 655 may be configured as or otherwise support a means for transmitting the first rank indication field in a first portion of the CSI report and the second rank indication field in a second portion of the CSI report.

In some examples, a bit width for the first rank indication field is based on a first number of bits associated with CSI of the joint transmission hypothesis and a second number of bits associated with CSI of the single transmission hypothesis.

In some examples, the bit width of the first rank indication field is further based on a maximum value of the first number of bits and the second number of bits, the bit width being the same for the joint rank indication field associated with the joint transmission hypothesis or the single transmission hypothesis.

In some examples, a bit width for the second rank indication field is based on a rank restriction for a second rank associated with the joint transmission hypothesis.

In some examples, the rank restriction parameter for obtaining CSI is applied only for a CSI report associated with a single transmission hypothesis.

In some examples, the rank combination component 650 may be configured as or otherwise support a means for determining a rank or rank combination associated with the joint transmission hypothesis based on a multiplexing scheme for the CSI report irrespective of the rank restriction parameter.

In some examples, the rank restriction parameter for obtaining CSI for the joint transmission hypothesis is based on a rank restriction parameter for obtaining CSI for a single transmission hypothesis.

In some examples, the rank restriction parameter applies to a first rank indicator of the at least one rank indicator, a second rank indicator of the at least one rank indicator, or a sum of the first rank indicator and the second rank indicator.

In some examples, the rank restriction parameter is configured for a single transmission hypothesis via a first control parameter, and for the joint transmission hypothesis via a second control parameter, the first control parameter being different from the second control parameter.

In some examples, the at least one rank indicator is associated with at least two layer indicators, and the LI field component 645 may be configured as or otherwise support a means for transmitting, to a base station, an indication of the at least two layer indicators in at least two separate layer indication fields.

In some examples, the at least two separate layer indication fields include a first layer indication field and a second layer indication field, and the LI field component 645 may be configured as or otherwise support a means for determining a bit width of the first layer indication field and the second layer indication field based on corresponding reported values of one or more rank indicators.

In some examples, the one or more rank indicators are associated with at least two layer indicators, and the LI field component 645 may be configured as or otherwise support a means for transmitting, to a base station, an indication of the at least two layer indicators in a joint layer indication field.

In some examples, the LI field component 645 may be configured as or otherwise support a means for determining a bit width of the first layer indication field based on a reported value of the one or more rank indicators.

Figure 7:
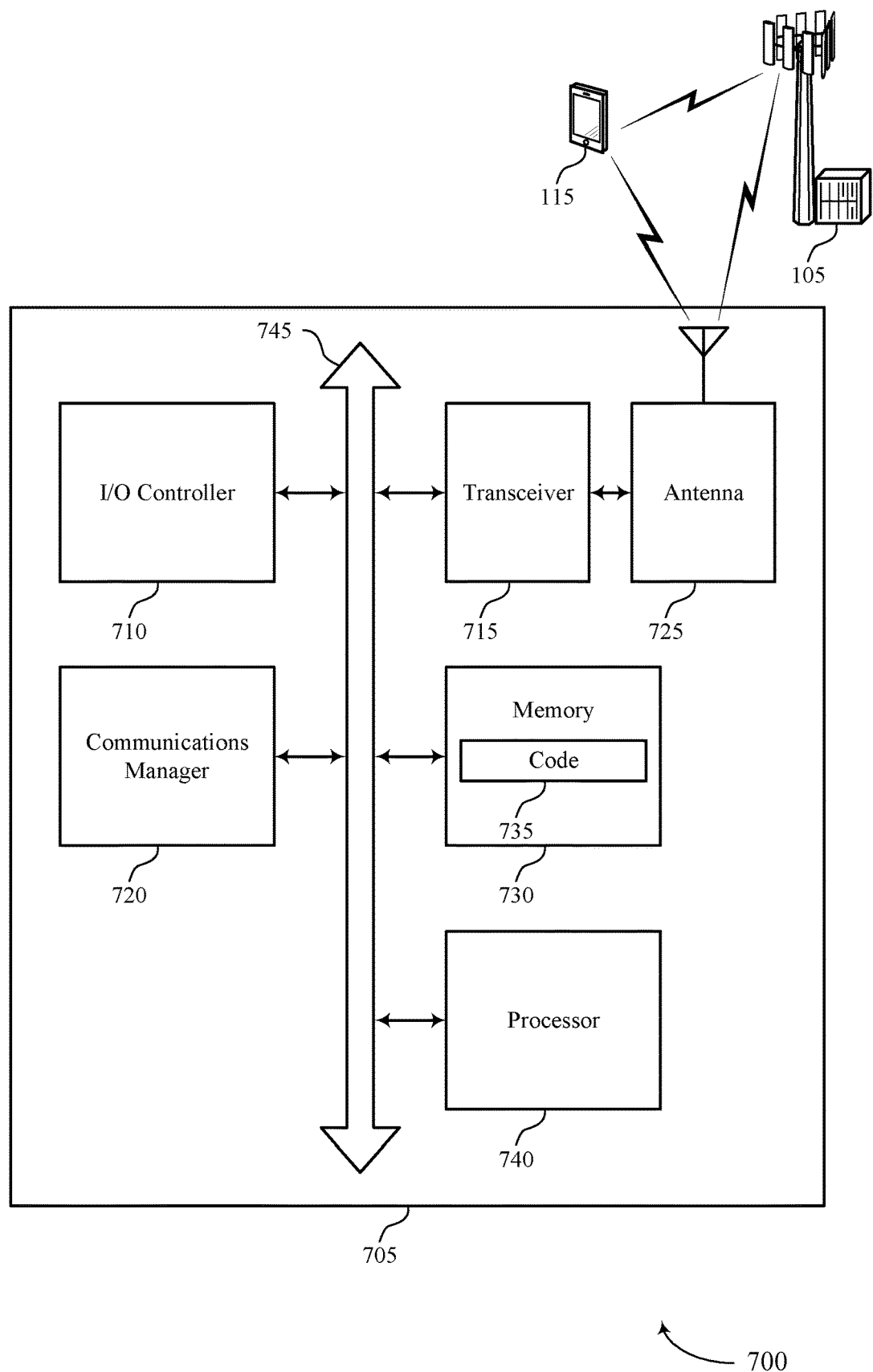
FIG. 7 shows a diagram of a system including a device that supports rank indicator and layer indicator signaling in NCJT CSI in accordance with aspects of the present disclosure.

FIG. 7 shows a diagram of a system 700 including a device 705 that supports rank indicator and layer indicator signaling in NCJT CSI in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting rank indicator and layer indicator signaling in NCJT CSI). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving an indication of a first CMR and a second CMR, each configured for measuring CSI-RSs, the first CMR associated with a first TCI state and the second CMR associated with a second TCI state. The communications manager 720 may be configured as or otherwise support a means for identifying a rank restriction parameter for obtaining CSI for a joint transmission hypothesis associated with the first CMR and the second CMR. The communications manager 720 may be configured as or otherwise support a means for transmitting a CSI report that includes at least one rank indicator corresponding to the joint transmission hypothesis in accordance with the rank restriction parameter.

By including or configuring the communications manager 720 in accordance with examples as described herein, the device 705 may support techniques for improved communication reliability, more efficient utilization of communication resources, and more efficient CSI reporting.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of rank indicator and layer indicator signaling in NCJT CSI as described herein, or the processor 740 and the memory 730 may be otherwise configured to perform or support such operations.

Figure 8:
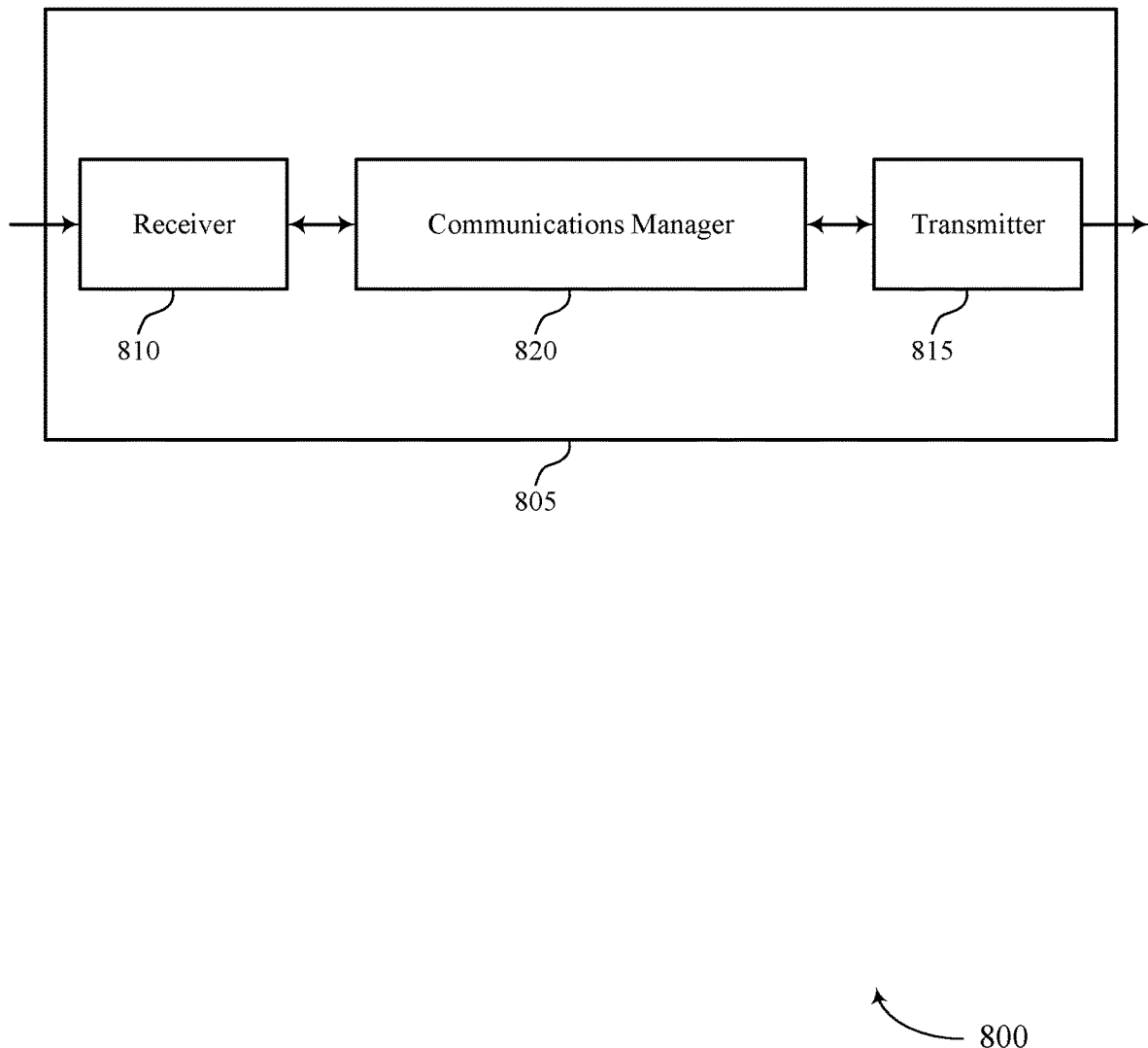
FIGS. 8 and 9 show block diagrams of devices that support rank indicator and layer indicator signaling in NCJT CSI in accordance with aspects of the present disclosure.

FIG. 8 shows a block diagram 800 of a device 805 that supports rank indicator and layer indicator signaling in NCJT CSI in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to rank indicator and layer indicator signaling in NCJT CSI). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to rank indicator and layer indicator signaling in NCJT CSI). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of rank indicator and layer indicator signaling in NCJT CSI as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, an indication of a first CMR and a second CMR, each configured for measuring CSI-RSs, the first CMR associated with a first TCI state and the second CMR associated with a second TCI state. The communications manager 820 may be configured as or otherwise support a means for transmitting, to the UE, a rank restriction parameter for obtaining CSI for a joint transmission hypothesis associated with the first CMR and the second CMR. The communications manager 820 may be configured as or otherwise support a means for receiving, in a CSI report that includes the CSI, at least one rank indicator corresponding in accordance with the transmitted rank restriction parameter or a different rank restriction parameter based on the at least one rank indicator being associated with joint transmission hypothesis.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources, and more efficient CSI reporting.

Figure 9:
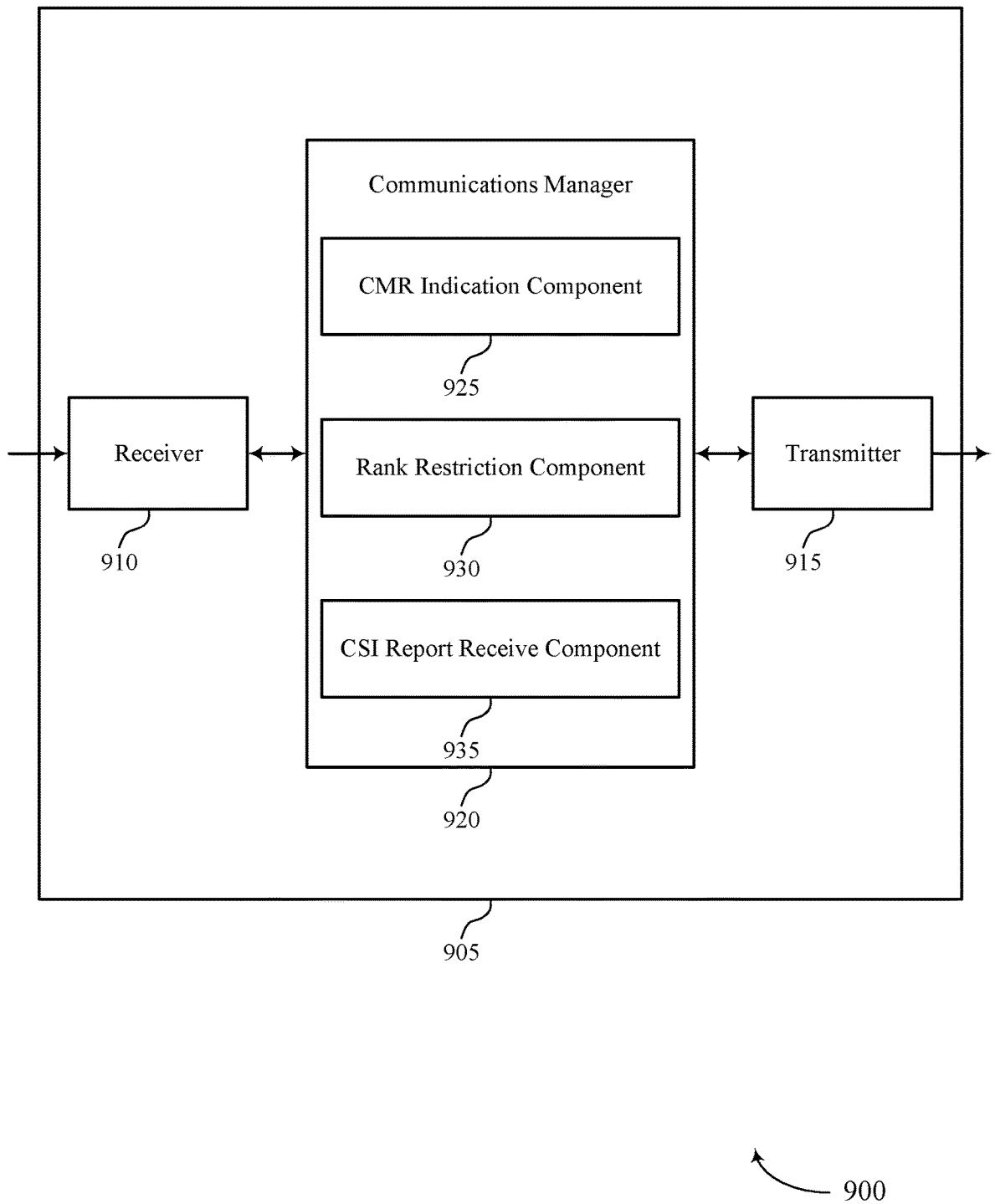

FIG. 9 shows a block diagram 900 of a device 905 that supports rank indicator and layer indicator signaling in NCJT CSI in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to rank indicator and layer indicator signaling in NCJT CSI). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to rank indicator and layer indicator signaling in NCJT CSI). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of rank indicator and layer indicator signaling in NCJT CSI as described herein. For example, the communications manager 920 may include an CMR indication component 925, a rank restriction component 930, a CSI report receive component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The CMR indication component 925 may be configured as or otherwise support a means for transmitting, to a UE, an indication of a first CMR and a second CMR, each configured for measuring CSI-RSs, the first CMR associated with a first TCI state and the second CMR associated with a second TCI state. The rank restriction component 930 may be configured as or otherwise support a means for transmitting, to the UE, a rank restriction parameter for obtaining CSI for a joint transmission hypothesis associated with the first CMR and the second CMR. The CSI report receive component 935 may be configured as or otherwise support a means for receiving, in a CSI report that includes the CSI, at least one rank indicator corresponding in accordance with the transmitted rank restriction parameter or a different rank restriction parameter based on the at least one rank indicator being associated with joint transmission hypothesis.

Figure 10:
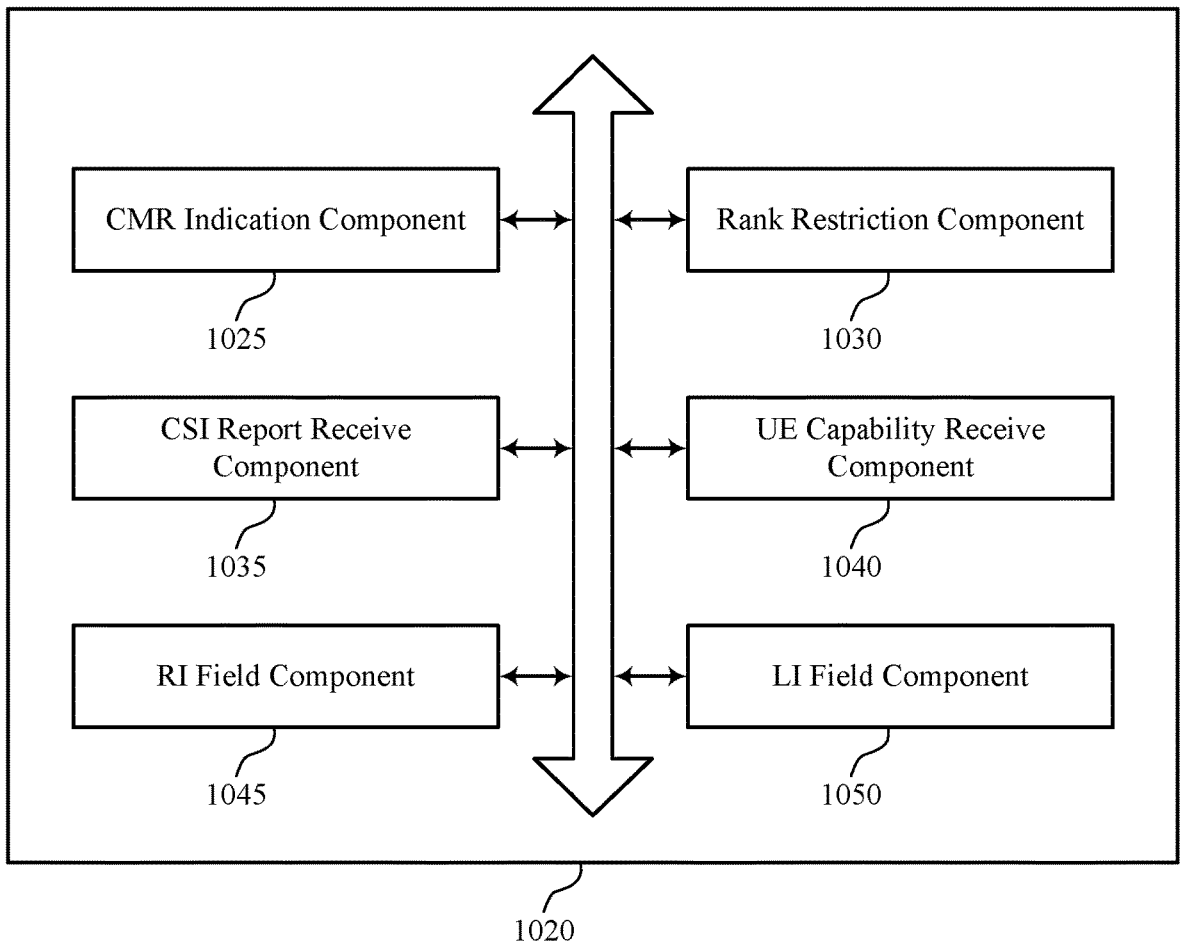
FIG. 10 shows a block diagram of a communications manager that supports rank indicator and layer indicator signaling in NCJT CSI in accordance with aspects of the present disclosure.

FIG. 10 shows a block diagram 1000 of a communications manager 1020 that supports rank indicator and layer indicator signaling in NCJT CSI in accordance with aspects of the present disclosure. The communications manager 1020 may be an example of aspects of a communications manager 820, a communications manager 920, or both, as described herein. The communications manager 1020, or various components thereof, may be an example of means for performing various aspects of rank indicator and layer indicator signaling in NCJT CSI as described herein. For example, the communications manager 1020 may include an CMR indication component 1025, a rank restriction component 1030, a CSI report receive component 1035, a UE capability receive component 1040, a RI field component 1045, a LI field component 1050, or any combination thereof. Each of these components may communicate, directly or indirectly, with one another (e.g., via one or more buses).

The communications manager 1020 may support wireless communications at a base station in accordance with examples as disclosed herein. The CMR indication component 1025 may be configured as or otherwise support a means for transmitting, to a UE, an indication of a first CMR and a second CMR, each configured for measuring CSI-RSs, the first CMR associated with a first TCI state and the second CMR associated with a second TCI state. The rank restriction component 1030 may be configured as or otherwise support a means for transmitting, to the UE, a rank restriction parameter for obtaining CSI for a joint transmission hypothesis associated with the first CMR and the second CMR. The CSI report receive component 1035 may be configured as or otherwise support a means for receiving, in a CSI report that includes the CSI, at least one rank indicator corresponding in accordance with the transmitted rank restriction parameter or a different rank restriction parameter based on the at least one rank indicator being associated with joint transmission hypothesis.

In some examples, the UE capability receive component 1040 may be configured as or otherwise support a means for receiving, from the UE, and indication of a capability of the UE to transmit the CSI report including the at least one rank indicator for a joint transmission hypothesis or a single transmission hypothesis in accordance with the rank restriction parameter.

In some examples, the at least one rank indicator includes two rank indicators, and the RI field component 1045 may be configured as or otherwise support a means for receiving the two rank indicators in a joint rank indication field in a first portion of the CSI report associated with the first TCI state and the second TCI state corresponding to the joint transmission hypothesis.

In some examples, the CSI report includes first CSI corresponding to the joint transmission hypothesis and second CSI corresponding to a single transmission hypothesis, and the CSI report receive component 1035 may be configured as or otherwise support a means for receiving the channel status information report having a bit width that is based on a set of multiple allowed rank combinations for the joint transmission hypothesis.

In some examples, the CSI report includes CSI corresponding to either the joint transmission hypothesis or a single transmission hypothesis, and the RI field component 1045 may be configured as or otherwise support a means for receiving the joint rank indication field having a bit width that is based on a first number of bits associated with CSI of the joint transmission hypothesis and a second number of bits associated with CSI of the single transmission hypothesis.

In some examples, the at least one rank indicator includes two rank indicators, and the RI field component 1045 may be configured as or otherwise support a means for receiving two rank indicators in separate rank indication fields in at least one portion of the CSI report.

In some examples, the RI field component 1045 may be configured as or otherwise support a means for receiving the separate rank indication fields in a first portion of the CSI report, the first portion of the CSI report having a constant payload size.

In some examples, the separate rank indication fields include a first rank indication field and a second rank indication field, and the RI field component 1045 may be configured as or otherwise support a means for receiving the first rank indication field and the second rank indication field having a bit width that is based on respective ranks of the first CMR and the second CMR of the CSI report.

In some examples, the separate rank indication fields include a first rank indication field and a second rank indication field, and the RI field component 1045 may be configured as or otherwise support a means for receiving the first rank indication field in a first portion of the CSI report and the second rank indication field in a second portion of the CSI report.

In some examples, a bit width for the first rank indication field is based on a first number of bits associated with CSI of the joint transmission hypothesis and a second number of bits associated with CSI of the single transmission hypothesis.

In some examples, a bit width for the second rank indication field is based on a rank restriction for a second rank associated with the joint transmission hypothesis.

In some examples, the rank restriction parameter for obtaining CSI is applied only for a CSI report associated with a single transmission hypothesis.

In some examples, a rank or rank combination associated with the single transmission hypothesis is based on a multiplexing scheme for the CSI report irrespective of the rank restriction parameter.

In some examples, the rank restriction parameter for obtaining CSI for the joint transmission hypothesis is based on a rank restriction parameter for obtaining CSI for a single transmission hypothesis.

In some examples, the rank restriction parameter applies to a first rank indicator of the at least one rank indicator, a second rank indicator of the at least one rank indicator, or a sum of the first rank indicator and the second rank indicator.

In some examples, the rank restriction parameter is configured for a single transmission hypothesis via a first control parameter, and for the joint transmission hypothesis via a second control parameter, the first control parameter being different from the second control parameter.

In some examples, the at least one rank indicator is associated with at least two layer indicators, and the LI field component 1050 may be configured as or otherwise support a means for receiving, from the UE, an indication of the at least two layer indicators in at least two separate layer indication fields.

In some examples, the at least two separate layer indication fields include a first layer indication field and a second layer indication field, the bit width of the first layer indication field and the second layer indication field based on corresponding reported values of one or more rank indicators.

In some examples, the one or more rank indicators are associated with at least two layer indicators, and the LI field component 1050 may be configured as or otherwise support a means for receiving, from the UE, an indication of the at least two layer indicators in a joint layer indication field.

In some examples, a bit width of the first layer indication field is based on a reported value of the one or more rank indicators.

Figure 11:
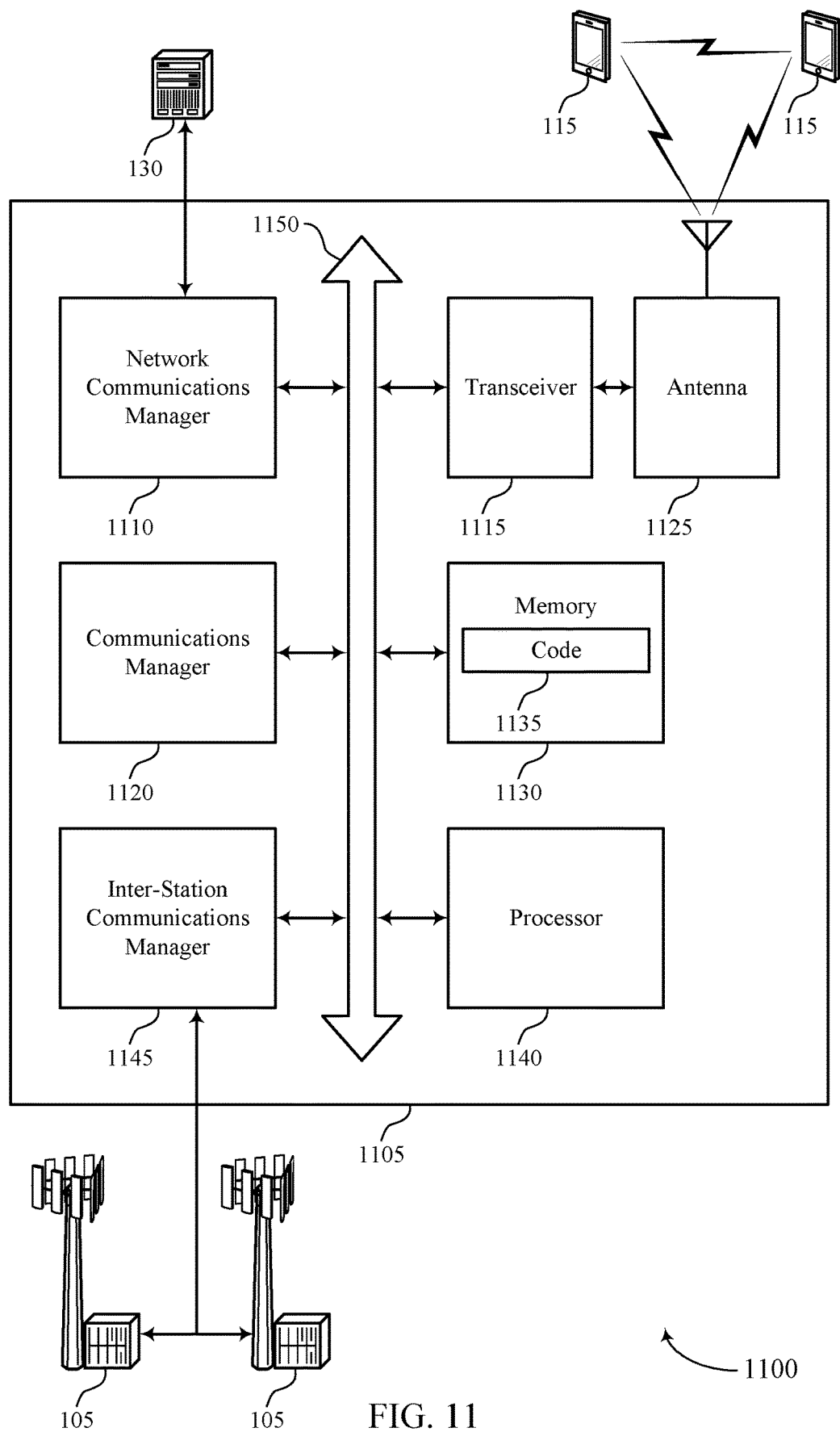
FIG. 11 shows a diagram of a system including a device that supports rank indicator and layer indicator signaling in NCJT CSI in accordance with aspects of the present disclosure.

FIG. 11 shows a diagram of a system 1100 including a device 1105 that supports rank indicator and layer indicator signaling in NCJT CSI in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting rank indicator and layer indicator signaling in NCJT CSI). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, an indication of a first CMR and a second CMR, each configured for measuring CSI-RSs, the first CMR associated with a first TCJ state and the second CMR associated with a second TCJ state. The communications manager 1120 may be configured as or otherwise support a means for transmitting, to the UE, a rank restriction parameter for obtaining CSI for a joint transmission hypothesis associated with the first CMR and the second CMR. The communications manager 1120 may be configured as or otherwise support a means for receiving, in a CSI report that includes the CSI, at least one rank indicator corresponding in accordance with the transmitted rank restriction parameter or a different rank restriction parameter based on the at least one rank indicator being associated with joint transmission hypothesis.

By including or configuring the communications manager 1120 in accordance with examples as described herein, the device 1105 may support techniques for improved communication reliability, more efficient utilization of communication resources, improved coordination between devices, and improved CSI reporting and formatting.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of rank indicator and layer indicator signaling in NCJT CSI as described herein, or the processor 1140 and the memory 1130 may be otherwise configured to perform or support such operations.

Figure 12:
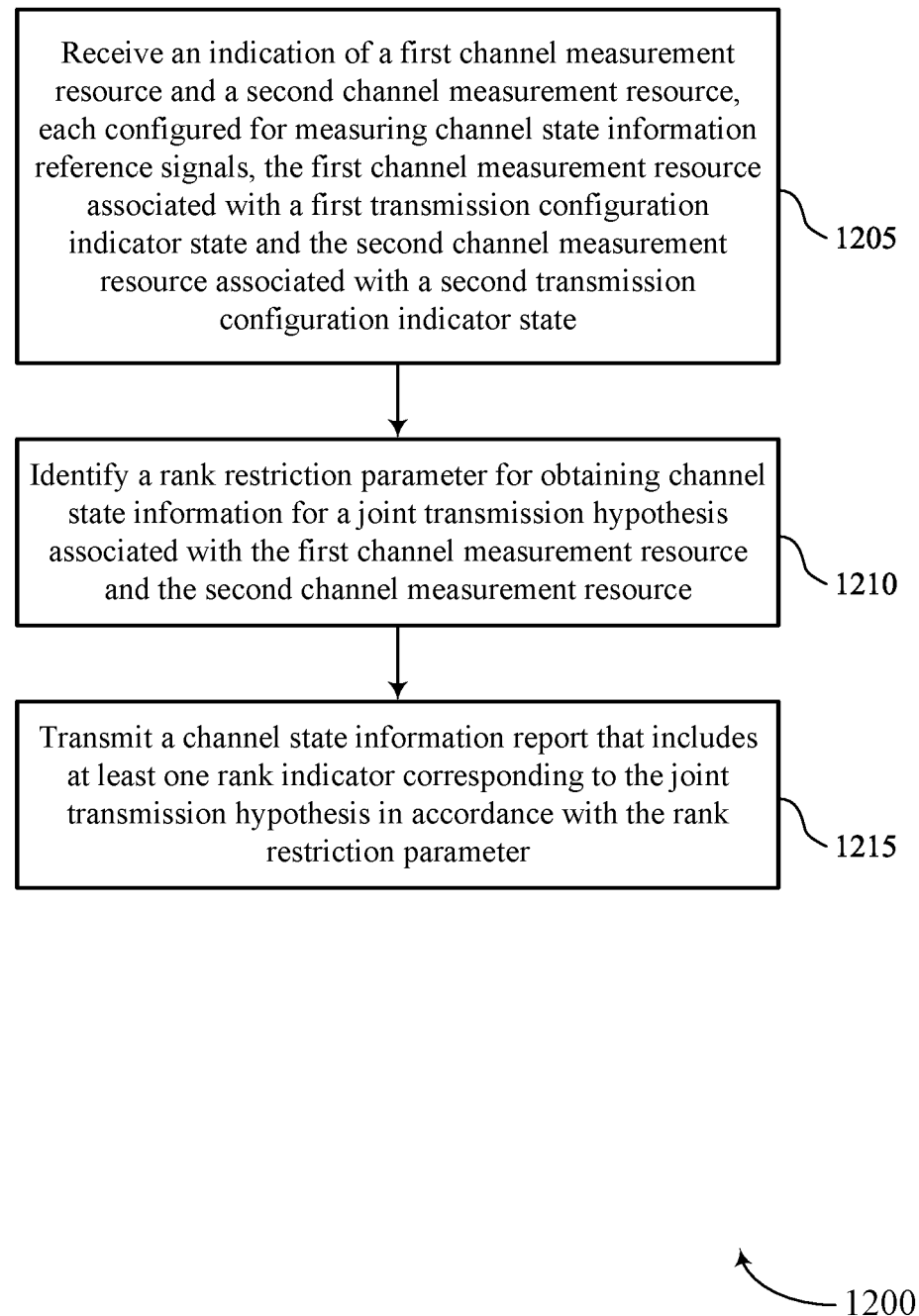
FIGS. 12 through 17 show flowcharts illustrating methods that support rank indicator and layer indicator signaling in NCJT CSI in accordance with aspects of the present disclosure.

FIG. 12 shows a flowchart illustrating a method 1200 that supports rank indicator and layer indicator signaling in NCJT CSI in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving an indication of a first CMR and a second CMR, each configured for measuring CSI-RSs, the first CMR associated with a first TCI state and the second CMR associated with a second TCI state. The operations of 1205 may be performed in accordance with examples as disclosed herein. In some examples, aspects of the operations of 1205 may be performed by an CMR identification component 625 as described with reference to FIG. 6.

At 1210, the method may include identifying a rank restriction parameter for obtaining CSI for a joint transmission hypothesis associated with the first CMR and the second CMR. The operations of 1210 may be performed in accordance with examples as disclosed herein. In some examples, aspects of the operations of 1210 may be performed by a rank restriction component 630 as described with reference to FIG. 6.

At 1215, the method may include transmitting a CSI report that includes at least one rank indicator corresponding to the joint transmission hypothesis in accordance with the rank restriction parameter. The operations of 1215 may be performed in accordance with examples as disclosed herein. In some examples, aspects of the operations of 1215 may be performed by a CSI report transmission component 635 as described with reference to FIG. 6.

Figure 13:
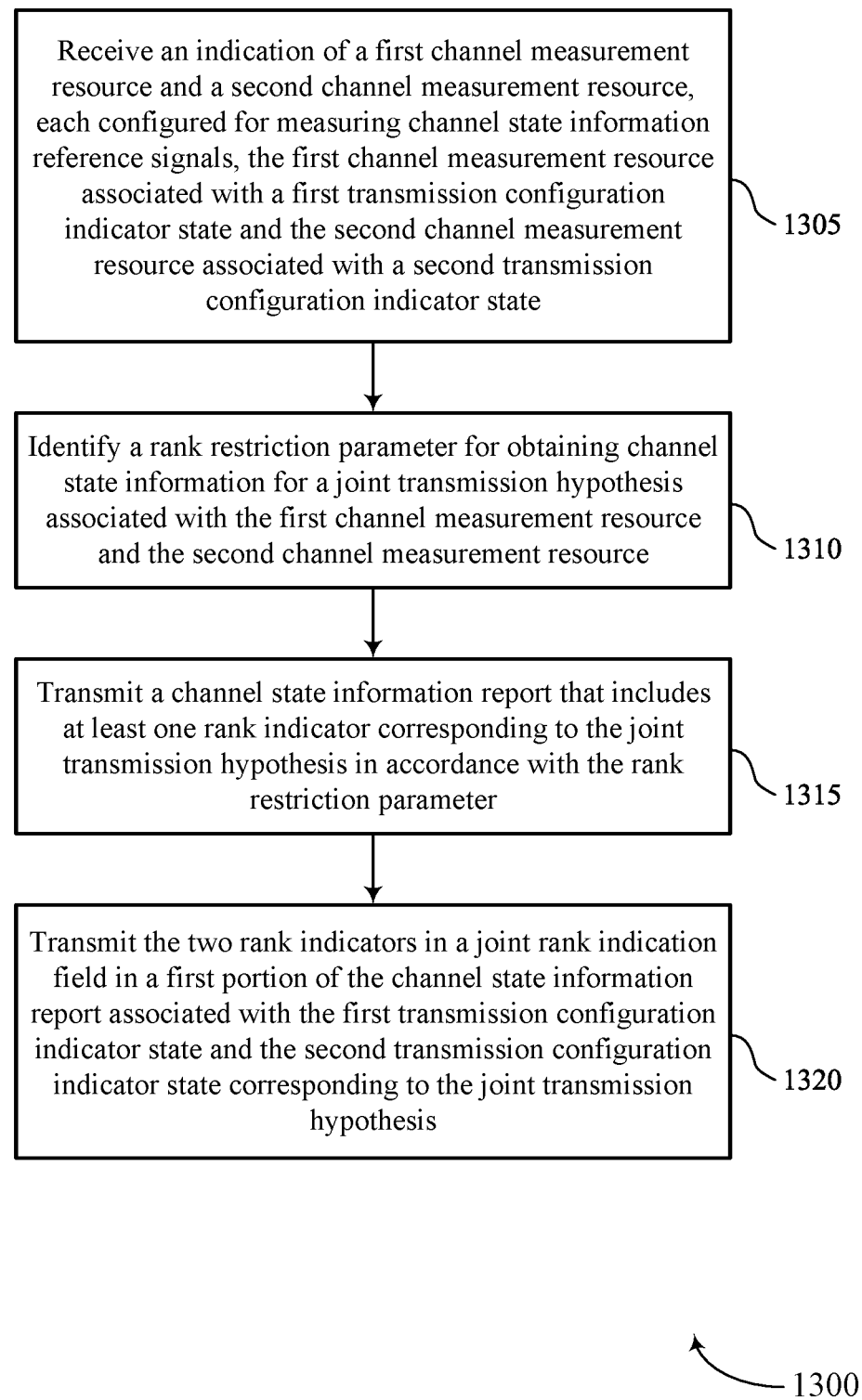

FIG. 13 shows a flowchart illustrating a method 1300 that supports rank indicator and layer indicator signaling in NCJT CSI in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving an indication of a first CMR and a second CMR, each configured for measuring CSI-RSs, the first CMR associated with a first TCI state and the second CMR associated with a second TCI state. The operations of 1305 may be performed in accordance with examples as disclosed herein. In some examples, aspects of the operations of 1305 may be performed by an CMR identification component 625 as described with reference to FIG. 6.

At 1310, the method may include identifying a rank restriction parameter for obtaining CSI for a joint transmission hypothesis associated with the first CMR and the second CMR. The operations of 1310 may be performed in accordance with examples as disclosed herein. In some examples, aspects of the operations of 1310 may be performed by a rank restriction component 630 as described with reference to FIG. 6.

At 1315, the method may include transmitting a CSI report that includes at least one rank indicator corresponding to the joint transmission hypothesis in accordance with the rank restriction parameter. The operations of 1315 may be performed in accordance with examples as disclosed herein. In some examples, aspects of the operations of 1315 may be performed by a CSI report transmission component 635 as described with reference to FIG. 6.

At 1320, the method may include transmitting the two rank indicators in a joint rank indication field in a first portion of the CSI report associated with the first TCI state and the second TCI state corresponding to the joint transmission hypothesis. The operations of 1320 may be performed in accordance with examples as disclosed herein. In some examples, aspects of the operations of 1320 may be performed by a CSI report transmission component 635 as described with reference to FIG. 6.

Figure 14:
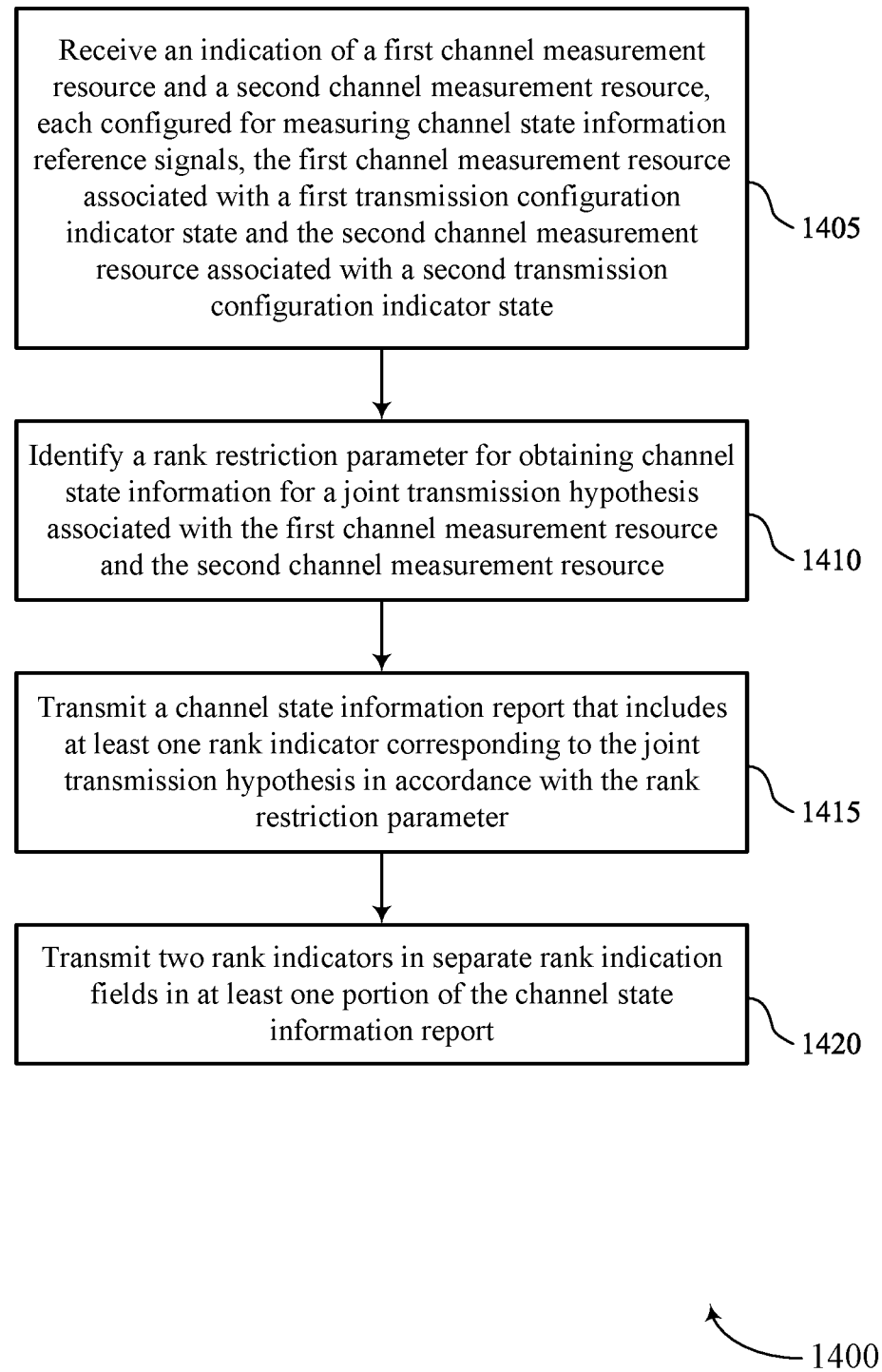

FIG. 14 shows a flowchart illustrating a method 1400 that supports rank indicator and layer indicator signaling in NCJT CSI in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving an indication of a first CMR and a second CMR, each configured for measuring CSI-RSs, the first CMR associated with a first TCI state and the second CMR associated with a second TCI state. The operations of 1405 may be performed in accordance with examples as disclosed herein. In some examples, aspects of the operations of 1405 may be performed by an CMR identification component 625 as described with reference to FIG. 6.

At 1410, the method may include identifying a rank restriction parameter for obtaining CSI for a joint transmission hypothesis associated with the first CMR and the second CMR. The operations of 1410 may be performed in accordance with examples as disclosed herein. In some examples, aspects of the operations of 1410 may be performed by a rank restriction component 630 as described with reference to FIG. 6.

At 1415, the method may include transmitting a CSI report that includes at least one rank indicator corresponding to the joint transmission hypothesis in accordance with the rank restriction parameter. The operations of 1415 may be performed in accordance with examples as disclosed herein. In some examples, aspects of the operations of 1415 may be performed by a CSI report transmission component 635 as described with reference to FIG. 6.

At 1420, the method may include transmitting two rank indicators in separate rank indication fields in at least one portion of the CSI report. The operations of 1420 may be performed in accordance with examples as disclosed herein. In some examples, aspects of the operations of 1420 may be performed by a CSI report transmission component 635 as described with reference to FIG. 6.

Figure 15:
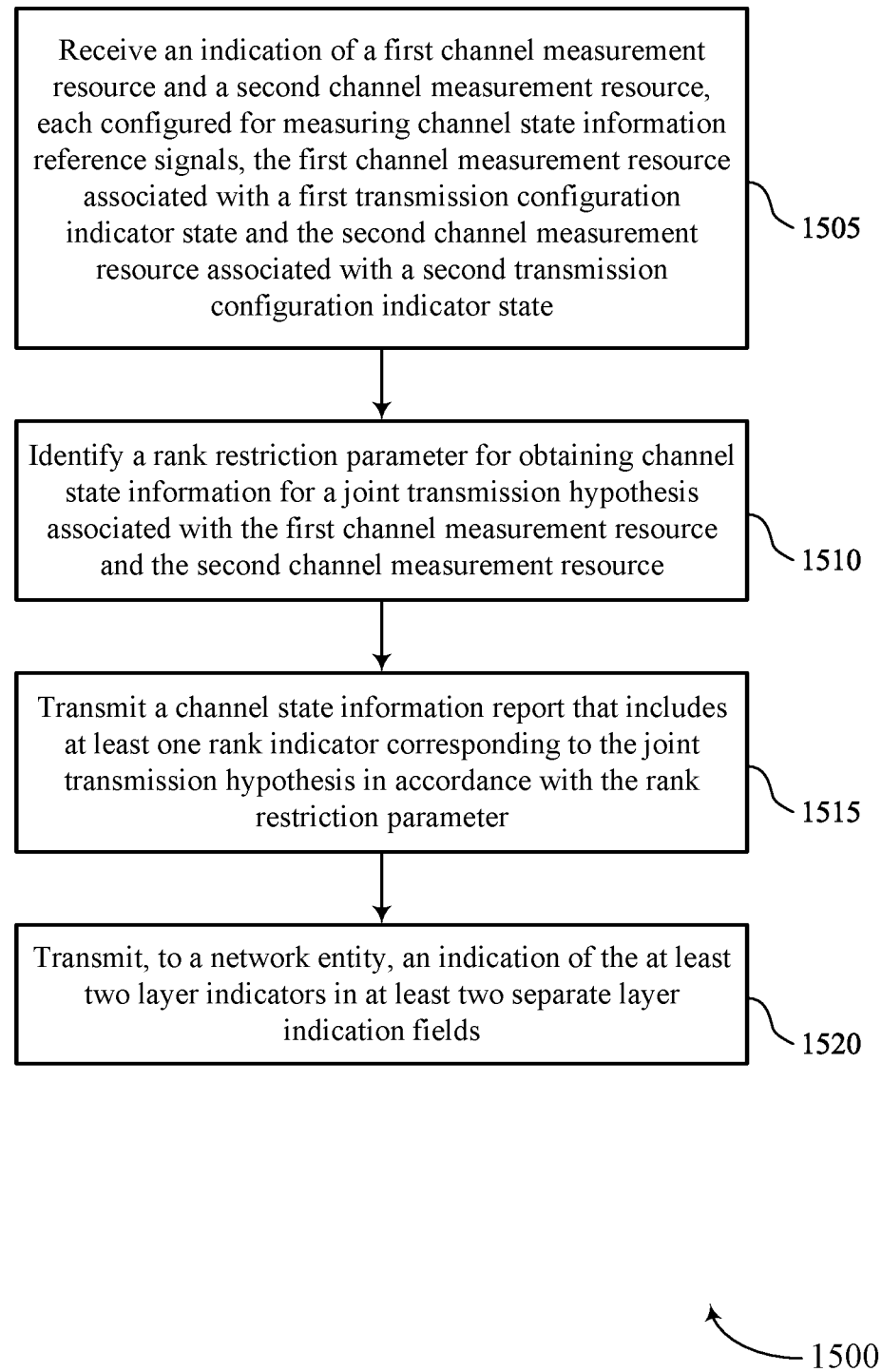

FIG. 15 shows a flowchart illustrating a method 1500 that supports rank indicator and layer indicator signaling in NCJT CSI in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving an indication of a first CMR and a second CMR, each configured for measuring CSI-RSs, the first CMR associated with a first TCI state and the second CMR associated with a second TCI state. The operations of 1505 may be performed in accordance with examples as disclosed herein. In some examples, aspects of the operations of 1505 may be performed by an CMR identification component 625 as described with reference to FIG. 6.

At 1510, the method may include identifying a rank restriction parameter for obtaining CSI for a joint transmission hypothesis associated with the first CMR and the second CMR. The operations of 1510 may be performed in accordance with examples as disclosed herein. In some examples, aspects of the operations of 1510 may be performed by a rank restriction component 630 as described with reference to FIG. 6.

At 1515, the method may include transmitting a CSI report that includes at least one rank indicator corresponding to the joint transmission hypothesis in accordance with the rank restriction parameter. The operations of 1515 may be performed in accordance with examples as disclosed herein. In some examples, aspects of the operations of 1515 may be performed by a CSI report transmission component 635 as described with reference to FIG. 6.

At 1520, the method may include transmitting, to a base station, an indication of the at least two layer indicators in at least two separate layer indication fields. The operations of 1520 may be performed in accordance with examples as disclosed herein. In some examples, aspects of the operations of 1520 may be performed by a LI field component 645 as described with reference to FIG. 6.

Figure 16:
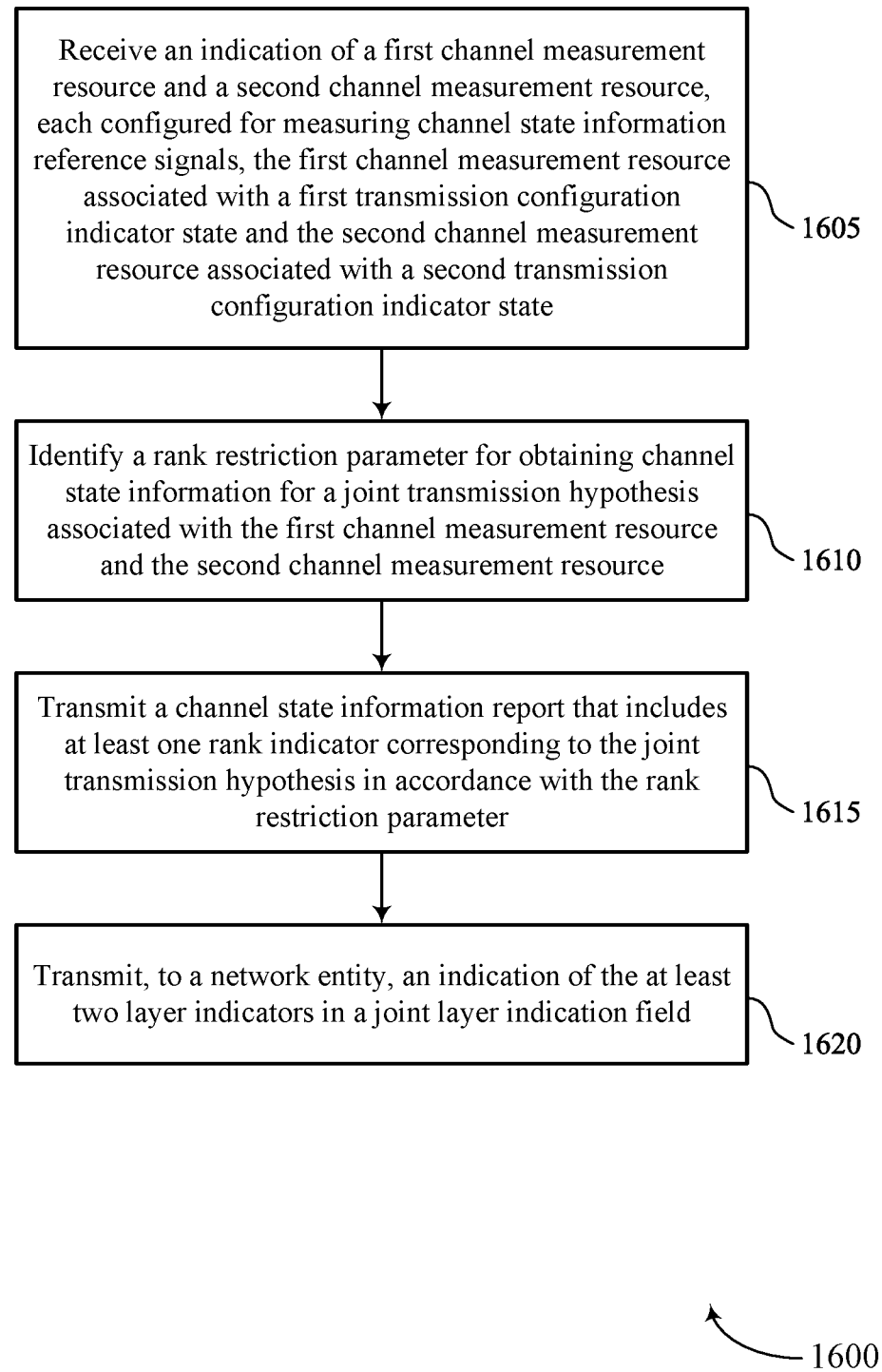

FIG. 16 shows a flowchart illustrating a method 1600 that supports rank indicator and layer indicator signaling in NCJT CSI in accordance with aspects of the present disclosure. The operations of the method 1600 may be implemented by a UE or its components as described herein. For example, the operations of the method 1600 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1605, the method may include receiving an indication of a first CMR and a second CMR, each configured for measuring CSI-RSs, the first CMR associated with a first TCI state and the second CMR associated with a second TCI state. The operations of 1605 may be performed in accordance with examples as disclosed herein. In some examples, aspects of the operations of 1605 may be performed by an CMR identification component 625 as described with reference to FIG. 6.

At 1610, the method may include identifying a rank restriction parameter for obtaining CSI for a joint transmission hypothesis associated with the first CMR and the second CMR. The operations of 1610 may be performed in accordance with examples as disclosed herein. In some examples, aspects of the operations of 1610 may be performed by a rank restriction component 630 as described with reference to FIG. 6.

At 1615, the method may include transmitting a CSI report that includes at least one rank indicator corresponding to the joint transmission hypothesis in accordance with the rank restriction parameter. The operations of 1615 may be performed in accordance with examples as disclosed herein. In some examples, aspects of the operations of 1615 may be performed by a CSI report transmission component 635 as described with reference to FIG. 6.

At 1620, the method may include transmitting, to a base station, an indication of the at least two layer indicators in a joint layer indication field. The operations of 1620 may be performed in accordance with examples as disclosed herein. In some examples, aspects of the operations of 1620 may be performed by a LI field component 645 as described with reference to FIG. 6.

Figure 17:
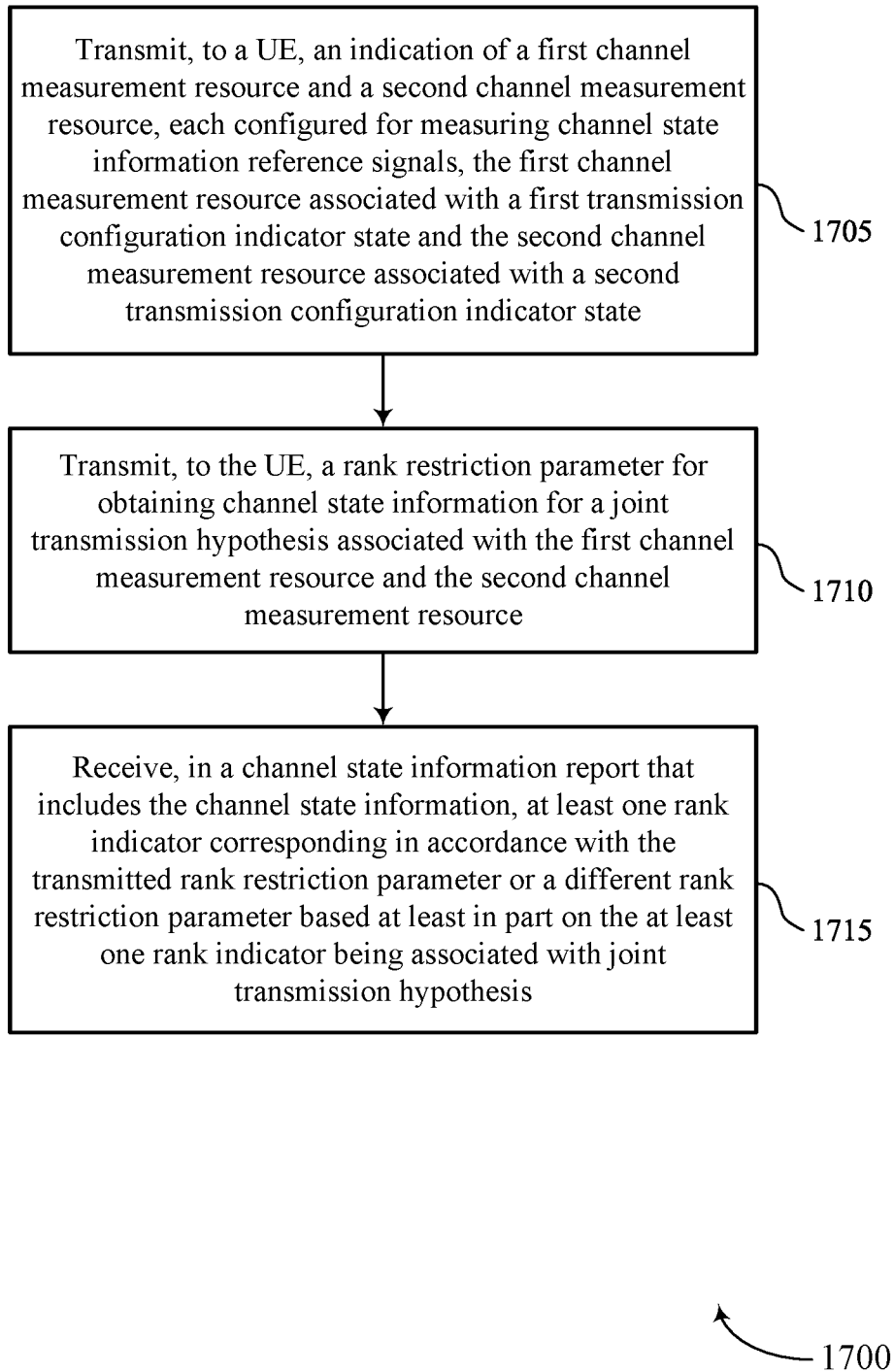

FIG. 17 shows a flowchart illustrating a method 1700 that supports rank indicator and layer indicator signaling in NCJT CSI in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication of a first CMR and a second CMR, each configured for measuring CSI-RSs, the first CMR associated with a first TCI state and the second CMR associated with a second TCI state. The operations of 1705 may be performed in accordance with examples as disclosed herein. In some examples, aspects of the operations of 1705 may be performed by an CMR indication component 1025 as described with reference to FIG. 10.

At 1710, the method may include transmitting, to the UE, a rank restriction parameter for obtaining CSI for a joint transmission hypothesis associated with the first CMR and the second CMR. The operations of 1710 may be performed in accordance with examples as disclosed herein. In some examples, aspects of the operations of 1710 may be performed by a rank restriction component 1030 as described with reference to FIG. 10.

At 1715, the method may include receiving, in a CSI report that includes the CSI, at least one rank indicator corresponding in accordance with the transmitted rank restriction parameter or a different rank restriction parameter based on the at least one rank indicator being associated with joint transmission hypothesis. The operations of 1715 may be performed in accordance with examples as disclosed herein. In some examples, aspects of the operations of 1715 may be performed by a CSI report receive component 1035 as described with reference to FIG. 10.

The following provides an overview of aspects of the present disclosure:

Aspect 1: A method for wireless communications at a UE, comprising: receiving an indication of a first CMR and a second CMR, each configured for measuring CSI-RSs, the first CMR associated with a first TCI state and the second CMR associated with a second TCI state; identifying a rank restriction parameter for obtaining CSI for a joint transmission hypothesis associated with the first CMR and the second CMR; and transmitting a CSI report that includes at least one rank indicator corresponding to the joint transmission hypothesis in accordance with the rank restriction parameter.

Aspect 2: The method of aspect 1, further comprising: transmitting, to a base station, a capability of the UE to transmit the CSI report comprising the at least one rank indicator for a joint transmission hypothesis or a single transmission hypothesis in accordance with the rank restriction parameter.

Aspect 3: The method of any of aspects 1 through 2, wherein the at least one rank indicator comprises two rank indicators, the method further comprising: transmitting the two rank indicators in a joint rank indication field in a first portion of the CSI report associated with the first TCI state and the second TCI state corresponding to the joint transmission hypothesis.

Aspect 4: The method of aspect 3, wherein the CSI report comprises first CSI corresponding to the joint transmission hypothesis and second CSI corresponding to a single transmission hypothesis, the method further comprising: identifying a plurality of allowed rank combinations for the joint transmission hypothesis; and determining a bit width of the joint rank indication field based at least in part on a plurality of allowed rank combinations.

Aspect 5: The method of any of aspects 3 through 4, wherein the CSI report comprises CSI corresponding to either the joint transmission hypothesis or a single transmission hypothesis, the method further comprising: identifying, based at least in part on the rank restriction parameter, a first number of bits associated with CSI of the joint transmission hypothesis and a second number of bits associated with CSI of the single transmission hypothesis; and determining a bit width of the joint rank indication field based at least in part on the first number of bits and the second number of bits.

Aspect 6: The method of aspect 5, wherein the bit width of the joint rank indication field is further based at least in part on a maximum value of the first number of bits and the second number of bits, the bit width being the same for the joint rank indication field associated with the joint transmission hypothesis or the single transmission hypothesis.

Aspect 7: The method of any of aspects 1 through 6, wherein the at least one rank indicator comprises two rank indicators, the method further comprising: transmitting two rank indicators in separate rank indication fields in at least one portion of the CSI report.

Aspect 8: The method of aspect 7, further comprising: transmitting the separate rank indication fields in a first portion of the CSI report, the first portion of the CSI report having a constant payload size.

Aspect 9: The method of aspect 8, wherein the separate rank indication fields comprise a first rank indication field and a second rank indication field, the method further comprising: determining a bit width of the first rank indication field and the second rank indication field based at least in part on respective ranks of the first CMR and the second CMR of the CSI report.

Aspect 10: The method of any of aspects 7 through 9, wherein the separate rank indication fields comprise a first rank indication field and a second rank indication field, the method further comprising: transmitting the first rank indication field in a first portion of the CSI report and the second rank indication field in a second portion of the CSI report.

Aspect 11: The method of aspect 10, wherein a bit width for the first rank indication field is based at least in part on a first number of bits associated with CSI of the joint transmission hypothesis and a second number of bits associated with CSI of the single transmission hypothesis.

Aspect 12: The method of aspect 11, wherein the bit width of the first rank indication field is further based at least in part on a maximum value of the first number of bits and the second number of bits, the bit width being the same for the first rank indication field associated with the joint transmission hypothesis or the single transmission hypothesis.

Aspect 13: The method of any of aspects 10 through 12, wherein a bit width for the second rank indication field is based at least in part on a rank restriction for a second rank associated with the joint transmission hypothesis.

Aspect 14: The method of any of aspects 1 through 13, wherein the rank restriction parameter for obtaining CSI is applied only for a CSI report associated with a single transmission hypothesis.

Aspect 15: The method of aspect 14, further comprising: determining a rank or rank combination associated with the joint transmission hypothesis based at least in part on a multiplexing scheme for the CSI report irrespective of the rank restriction parameter.

Aspect 16: The method of any of aspects 1 through 15, wherein the rank restriction parameter for obtaining CSI for the joint transmission hypothesis is based at least in part on a rank restriction parameter for obtaining CSI for a single transmission hypothesis.

Aspect 17: The method of aspect 16, wherein the rank restriction parameter applies to a first rank indicator of the at least one rank indicator, a second rank indicator of the at least one rank indicator, or a sum of the first rank indicator and the second rank indicator.

Aspect 18: The method of any of aspects 1 through 17, wherein the rank restriction parameter is configured for a single transmission hypothesis via a first control parameter, and for the joint transmission hypothesis via a second control parameter, the first control parameter being different from the second control parameter.

Aspect 19: The method of any of aspects 1 through 18, wherein the at least one rank indicator is associated with at least two layer indicators, the method further comprising: transmitting, to a base station, an indication of the at least two layer indicators in at least two separate layer indication fields.

Aspect 20: The method of aspect 19, wherein the at least two separate layer indication fields comprise a first layer indication field and a second layer indication field, the method further comprising: determining a bit width of the first layer indication field and the second layer indication field based at least in part on corresponding reported values of one or more rank indicators.

Aspect 21: The method of any of aspects 1 through 20, wherein the one or more rank indicators are associated with at least two layer indicators, the method further comprising: transmitting, to a base station, an indication of the at least two layer indicators in a joint layer indication field.

Aspect 22: The method of aspect 21, further comprising: determining a bit width of the joint layer indication field based at least in part on a reported value of the one or more rank indicators.

Aspect 23: A method for wireless communications at a base station, comprising: transmitting, to a UE, an indication of a first CMR and a second CMR, each configured for measuring CSI-RSs, the first CMR associated with a first TCJ state and the second CMR associated with a second TCJ state; transmitting, to the UE, a rank restriction parameter for obtaining CSI for a joint transmission hypothesis associated with the first CMR and the second CMR; and receiving, in a CSI report that includes the CSI, at least one rank indicator corresponding in accordance with the transmitted rank restriction parameter or a different rank restriction parameter based at least in part on the at least one rank indicator being associated with joint transmission hypothesis.

Aspect 24: The method of aspect 23, further comprising: receiving, from the UE, and indication of a capability of the UE to transmit the CSI report comprising the at least one rank indicator for a joint transmission hypothesis or a single transmission hypothesis in accordance with the rank restriction parameter.

Aspect 25: The method of any of aspects 23 through 24, wherein the at least one rank indicator comprises two rank indicators, the method further comprising: receiving the two rank indicators in a joint rank indication field in a first portion of the CSI report associated with the first TCJ state and the second TCJ state corresponding to the joint transmission hypothesis.

Aspect 26: The method of aspect 25, wherein the CSI report comprises first CSI corresponding to the joint transmission hypothesis and second CSI corresponding to a single transmission hypothesis, the method further comprising: receiving the channel status information report having a bit width that is based at least in part on a plurality of allowed rank combinations for the joint transmission hypothesis.

Aspect 27: The method of any of aspects 25 through 26, wherein the CSI report comprises CSI corresponding to either the joint transmission hypothesis or a single transmission hypothesis, the method further comprising: receiving the joint rank indication field having a bit width that is based at least in part on a first number of bits associated with CSI of the joint transmission hypothesis and a second number of bits associated with CSI of the single transmission hypothesis.

Aspect 28: The method of any of aspects 23 through 27, wherein the at least one rank indicator comprises two rank indicators, the method further comprising: receiving two rank indicators in separate rank indication fields in at least one portion of the CSI report.

Aspect 29: The method of aspect 28, further comprising: receiving the separate rank indication fields in a first portion of the CSI report, the first portion of the CSI report having a constant payload size.

Aspect 30: The method of aspect 29, wherein the separate rank indication fields comprise a first rank indication field and a second rank indication field, the method further comprising: receiving the first rank indication field and the second rank indication field having a bit width that is based at least in part on respective ranks of the first CMR and the second CMR of the CSI report.

Aspect 31: The method of any of aspects 28 through 30, wherein the separate rank indication fields comprise a first rank indication field and a second rank indication field, the method further comprising: receiving the first rank indication field in a first portion of the CSI report and the second rank indication field in a second portion of the CSI report.

Aspect 32: The method of aspect 31, wherein a bit width for the first rank indication field is based at least in part on a first number of bits associated with CSI of the joint transmission hypothesis and a second number of bits associated with CSI of the single transmission hypothesis.

Aspect 33: The method of any of aspects 31 through 32, wherein a bit width for the second rank indication field is based at least in part on a rank restriction for a second rank associated with the joint transmission hypothesis.

Aspect 34: The method of any of aspects 23 through 33, wherein the rank restriction parameter for obtaining CSI is applied only for a CSI report associated with a single transmission hypothesis.

Aspect 35: The method of aspect 34, wherein a rank or rank combination associated with the single transmission hypothesis is based at least in part on a multiplexing scheme for the CSI report irrespective of the rank restriction parameter.

Aspect 36: The method of any of aspects 23 through 35, wherein the rank restriction parameter for obtaining CSI for the joint transmission hypothesis is based at least in part on a rank restriction parameter for obtaining CSI for a single transmission hypothesis.

Aspect 37: The method of aspect 36, wherein the rank restriction parameter applies to a first rank indicator of the at least one rank indicator, a second rank indicator of the at least one rank indicator, or a sum of the first rank indicator and the second rank indicator.

Aspect 38: The method of any of aspects 23 through 37, wherein the rank restriction parameter is configured for a single transmission hypothesis via a first control parameter, and for the joint transmission hypothesis via a second control parameter, the first control parameter being different from the second control parameter.

Aspect 39: The method of any of aspects 23 through 38, wherein the at least one rank indicator is associated with at least two layer indicators, the method further comprising: receiving, from the UE, an indication of the at least two layer indicators in at least two separate layer indication fields.

Aspect 40: The method of aspect 39, wherein the at least two separate layer indication fields comprise a first layer indication field and a second layer indication field, the bit width of the first layer indication field and the second layer indication field based at least in part on corresponding reported values of one or more rank indicators.

Aspect 41: The method of any of aspects 23 through 40, wherein the one or more rank indicators are associated with at least two layer indicators, the method further comprising: receiving, from the UE, an indication of the at least two layer indicators in a joint layer indication field.

Aspect 42: The method of aspect 41, wherein a bit width of the joint layer indication field is based at least in part on a reported value of the one or more rank indicators.

Aspect 43: An apparatus for wireless communications at a UE, comprising a processor; memory coupled with the processor; and instructions stored in the memory and executable by the processor to cause the apparatus to perform a method of any of aspects 1 through 22.

Aspect 44: An apparatus for wireless communications at a UE, comprising at least one means for performing a method of any of aspects 1 through 22.

Aspect 45: A non-transitory computer-readable medium storing code for wireless communications at a UE, the code comprising instructions executable by a processor to perform a method of any of aspects 1 through 22.

Aspect 46: An apparatus for wireless communications at a base station, comprising a processor; memory coupled with the processor; and instructions stored in the memory and executable by the processor to cause the apparatus to perform a method of any of aspects 23 through 42.

Aspect 47: An apparatus for wireless communications at a base station, comprising at least one means for performing a method of any of aspects 23 through 42.

Aspect 48: A non-transitory computer-readable medium storing code for wireless communications at a base station, the code comprising instructions executable by a processor to perform a method of any of aspects 23 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving an indication of a first channel measurement resource and a second channel measurement resource, each configured for measuring channel state information reference signals, the first channel measurement resource associated with a first transmission configuration indicator state and the second channel measurement resource associated with a second transmission configuration indicator state;
    receiving a rank restriction parameter to obtain channel state information for a joint transmission hypothesis associated with the first channel measurement resource and the second channel measurement resource; and
    transmitting a channel state information report that includes at least two rank indicators reported via a joint rank indication field that maps the at least two rank indicators to at least one rank combination of a plurality of allowed rank combinations corresponding to the joint transmission hypothesis in accordance with the rank restriction parameter, the at least two rank indicators comprising a first rank indicator associated with the first channel measurement resource and a second rank indicator associated with the second channel measurement resource.

2. The method of claim 1, further comprising:
    transmitting the at least two rank indicators in the joint rank indication field in a first portion of the channel state information report associated with the first transmission configuration indicator state and the second transmission configuration indicator state corresponding to the joint transmission hypothesis.

3. The method of claim 2, wherein the channel state information report comprises first channel state information corresponding to the joint transmission hypothesis and second channel state information corresponding to a single transmission hypothesis, the method further comprising:
    determining a bit width of the joint rank indication field based at least in part on the plurality of allowed rank combinations.

4. The method of claim 2, wherein the channel state information report comprises channel state information corresponding to either the joint transmission hypothesis or a single transmission hypothesis, the method further comprising:
    identifying, based at least in part on the rank restriction parameter, a first number of bits associated with the channel state information of the joint transmission hypothesis and a second number of bits associated with the channel state information of the single transmission hypothesis; and
    determining a bit width of the joint rank indication field based at least in part on the first number of bits and the second number of bits.

5. The method of claim 4, wherein the bit width of the joint rank indication field is further based at least in part on a maximum value of the first number of bits and the second number of bits, the bit width being equal to the joint rank indication field associated with the joint transmission hypothesis or the single transmission hypothesis.

6. The method of claim 1, wherein the rank restriction parameter is configured for a single transmission hypothesis via a first control parameter, and for the joint transmission hypothesis via a second control parameter, the first control parameter being different from the second control parameter.

7. The method of claim 1, wherein the at least two rank indicators are associated with at least two layer indicators, the method further comprising:
    transmitting, to a network entity, an indication of the at least two layer indicators in at least two separate layer indication fields.

8. The method of claim 7, wherein the at least two separate layer indication fields comprise a first layer indication field and a second layer indication field, the method further comprising:
    determining a bit width of the first layer indication field and the second layer indication field based at least in part on corresponding reported values of the at least two rank indicators.

9. The method of claim 1, further comprising:
    transmitting, to a network entity, a capability of the UE to transmit the channel state information report comprising the at least two rank indicators for the joint transmission hypothesis or a single transmission hypothesis in accordance with the rank restriction parameter.

10. The method of claim 1, further comprising:
    transmitting the at least two rank indicators in separate rank indication fields in at least one portion of the channel state information report.

11. The method of claim 10, further comprising:
    transmitting the separate rank indication fields in a first portion of the channel state information report, the first portion of the channel state information report having a constant payload size.

12. The method of claim 11, wherein the separate rank indication fields comprise a first rank indication field and a second rank indication field, the method further comprising:
    determining a bit width of the first rank indication field and the second rank indication field based at least in part on respective ranks of the first channel measurement resource and the second channel measurement resource of the channel state information report.

13. The method of claim 10, wherein the separate rank indication fields comprise a first rank indication field and a second rank indication field, the method further comprising:
    transmitting the first rank indication field in a first portion of the channel state information report and the second rank indication field in a second portion of the channel state information report.

14. The method of claim 13, wherein a bit width for the first rank indication field is based at least in part on a first number of bits associated with channel state information of the joint transmission hypothesis and a second number of bits associated with channel state information of a single transmission hypothesis.

15. The method of claim 14, wherein the bit width of the first rank indication field is further based at least in part on a maximum value of the first number of bits and the second number of bits, the bit width being equal to the first rank indication field associated with the joint transmission hypothesis or the single transmission hypothesis.

16. The method of claim 13, wherein a bit width for the second rank indication field is based at least in part on a rank restriction for a second rank associated with the joint transmission hypothesis.

17. The method of claim 1, wherein the rank restriction parameter for obtaining the channel state information is applied only for the channel state information report associated with a single transmission hypothesis.

18. The method of claim 17, further comprising:
determining a rank or rank combination associated with the joint transmission hypothesis based at least in part on a multiplexing scheme for the channel state information report irrespective of the rank restriction parameter.

19. The method of claim 1, wherein the rank restriction parameter for obtaining the channel state information for the joint transmission hypothesis is based at least in part on the rank restriction parameter for obtaining channel state information for a single transmission hypothesis.

20. The method of claim 19, wherein the rank restriction parameter applies to the first rank indicator of the at least two rank indicators, the second rank indicator of the at least two rank indicators, or a sum of the first rank indicator and the second rank indicator.

21. The method of claim 1, wherein the at least two rank indicators are associated with at least two layer indicators, the method further comprising:
transmitting, to a network entity, an indication of the at least two layer indicators in a joint layer indication field.

22. The method of claim 21, further comprising:
determining a bit width of the joint layer indication field based at least in part on a reported value of the at least two rank indicators.

23. A method for wireless communications at a network entity, comprising:
transmitting, to a user equipment (UE), an indication of a first channel measurement resource and a second channel measurement resource, each configured for measuring channel state information reference signals, the first channel measurement resource associated with a first transmission configuration indicator state and the second channel measurement resource associated with a second transmission configuration indicator state;
transmitting, to the UE, a rank restriction parameter for obtaining channel state information for a joint transmission hypothesis associated with the first channel measurement resource and the second channel measurement resource; and
receiving, in a channel state information report that includes the channel state information, at least two rank indicators reported via a joint rank indication field that maps the at least two rank indicators to at least one rank combination of a plurality of allowed rank combinations corresponding to the rank restriction parameter or a different rank restriction parameter based at least in part on the at least two rank indicators being associated with the joint transmission hypothesis, the at least two rank indicators comprising a first rank indicator associated with the first channel measurement resource and a second rank indicator associated with the second channel measurement resource.

24. The method of claim 23, further comprising:
receiving the at least two rank indicators in the joint rank indication field in a first portion of the channel state information report associated with the first transmission configuration indicator state and the second transmission configuration indicator state corresponding to the joint transmission hypothesis.

25. The method of claim 24, wherein the channel state information report comprises first channel state information corresponding to the joint transmission hypothesis and second channel state information corresponding to a single transmission hypothesis, the method further comprising:
receiving the channel state information report having a bit width that is based at least in part on the plurality of allowed rank combinations for the joint transmission hypothesis.

26. The method of claim 24, wherein the channel state information report comprises channel state information corresponding to either the joint transmission hypothesis or a single transmission hypothesis, the method further comprising:
receiving the joint rank indication field having a bit width that is based at least in part on a first number of bits associated with the channel state information of the joint transmission hypothesis and a second number of bits associated with the channel state information of the single transmission hypothesis.

27. The method of claim 23, wherein the rank restriction parameter is configured for a single transmission hypothesis via a first control parameter, and for the joint transmission hypothesis via a second control parameter, the first control parameter being different from the second control parameter.

28. The method of claim 23, wherein the at least two rank indicators are associated with at least two layer indicators, the method further comprising:
receiving, from the UE, an indication of the at least two layer indicators in at least two separate layer indication fields.

29. An apparatus for wireless communications at a user equipment (UE), comprising:
a memory; and
a processor coupled to the memory and configured to:
receive an indication of a first channel measurement resource and a second channel measurement resource, each configured for measuring channel state information reference signals, the first channel measurement resource associated with a first transmission configuration indicator state and the second channel measurement resource associated with a second transmission configuration indicator state;
receive a rank restriction parameter to obtain channel state information for a joint transmission hypothesis associated with the first channel measurement resource and the second channel measurement resource; and
transmit a channel state information report that includes at least two rank indicators reported via a joint rank indication field that maps the at least two rank indicators to at least one rank combination of a plurality of allowed rank combinations corresponding to the joint transmission hypothesis in accordance with the rank restriction parameter, the at least two rank indicators comprising a first rank indicator associated with the first channel measurement resource and a second rank indicator associated with the second channel measurement resource.

30. An apparatus for wireless communications at a network entity, comprising:
- a memory; and
- a processor coupled to the memory and configured to:
  - transmit, to a user equipment (UE), an indication of a first channel measurement resource and a second channel measurement resource, each configured for measuring channel state information reference signals, the first channel measurement resource associated with a first transmission configuration indicator state and the second channel measurement resource associated with a second transmission configuration indicator state;
  - transmit, to the UE, a rank restriction parameter for obtaining channel state information for a joint transmission hypothesis associated with the first channel measurement resource and the second channel measurement resource; and
  - receive, in a channel state information report that includes the channel state information, at least two rank indicators reported via a joint rank indication field that maps the at least two rank indicators to at least one rank combination of a plurality of allowed rank combinations corresponding to the rank restriction parameter or a different rank restriction parameter based at least in part on the at least two rank indicators being associated with the joint transmission hypothesis, the at least two rank indicators comprising a first rank indicator associated with the first channel measurement resource and a second rank indicator associated with the second channel measurement resource.

* * * * *